(12) United States Patent
Hildom et al.

(10) Patent No.: US 10,881,561 B2
(45) Date of Patent: Jan. 5, 2021

(54) SHIFTABLE ASSEMBLY FOR A PLATFORM WHEELCHAIR LIFT

(71) Applicant: Fenton Mobility Products, Inc., Jamestown, NY (US)

(72) Inventors: Gerald James Hildom, Jamestown, NY (US); Keven Crawford, Winamac, IN (US); Sean Clinton Fenton, Falconer, NY (US); Scott Ivan Fenton, Sinclairville, NY (US)

(73) Assignee: Fenton Mobility Products, Inc., Jamestown, NY (US)

(*) Notice: Subject to any disclaimer, the term of this patent is extended or adjusted under 35 U.S.C. 154(b) by 312 days.

(21) Appl. No.: 15/491,598

(22) Filed: Apr. 19, 2017

(65) Prior Publication Data
US 2020/0078235 A1 Mar. 12, 2020

Related U.S. Application Data

(60) Provisional application No. 62/395,771, filed on Sep. 16, 2016.

(51) Int. Cl.
*A61G 3/06* (2006.01)
*F16H 19/04* (2006.01)

(52) U.S. Cl.
CPC .............. *A61G 3/062* (2013.01); *F16H 19/04* (2013.01); *Y10S 414/134* (2013.01)

(58) Field of Classification Search
CPC . A61G 3/062; Y10S 414/134; Y10T 74/1967; F16H 19/04

USPC ............ 254/2; 414/921; 74/422; 296/65.04; 248/424, 429, 430
See application file for complete search history.

(56) References Cited

U.S. PATENT DOCUMENTS

| | | | | |
|---|---|---|---|---|
| 4,101,119 A | * | 7/1978 | Speiser | B25B 1/02 269/203 |
| 4,225,177 A | * | 9/1980 | Kluting | B60N 2/0232 188/69 |
| 4,275,914 A | * | 6/1981 | Holweg | B60N 2/0232 248/429 |
| 4,409,860 A | * | 10/1983 | Moriyama | B23Q 1/621 108/143 |
| 4,973,022 A | * | 11/1990 | Mayland | A61G 3/0808 188/DIG. 1 |

(Continued)

FOREIGN PATENT DOCUMENTS

| CH | 693376 | 7/2003 |
|---|---|---|
| WO | 2006/135970 | 12/2006 |

OTHER PUBLICATIONS https://www.braunability.com/wheelchair-lifts, last accessed May 25, 2017.

*Primary Examiner* — Tyrone V Hall, Jr.
*Assistant Examiner* — Mahdi H Nejad
(74) *Attorney, Agent, or Firm* — Simpson & Simpson, PLLC; Michael Nicholas Vranjes

(57) ABSTRACT

An assembly for shifting a wheelchair lift within a vehicle, including a housing arranged to be secured to a floor of the vehicle and extend substantially parallel relative to an opening of a side doorway in the vehicle. The housing includes a bottom plate connected to a top plate and forming a first channel therebetween, a slidable member arranged within the first channel, and a means for displacing the slidable member along the first channel from a first position when stored to a second position in operation.

19 Claims, 27 Drawing Sheets

(56) References Cited

U.S. PATENT DOCUMENTS

| | | | | |
|---|---|---|---|---|
| 5,180,275 | A * | 1/1993 | Czech | A61G 3/06 187/200 |
| 5,582,070 | A * | 12/1996 | Dominguez | F16H 19/04 192/143 |
| 6,023,989 | A * | 2/2000 | Imase | F16H 19/04 74/422 |
| 6,089,817 | A | 7/2000 | Tauer | |
| 6,102,648 | A * | 8/2000 | Fretwell | A61G 3/06 14/69.5 |
| 7,632,058 | B2 | 12/2009 | Ablabutyan et al. | |
| 7,815,413 | B2 | 10/2010 | Fisher et al. | |
| 8,231,045 | B2 * | 7/2012 | Lagerkvist | B23K 37/0229 219/124.1 |
| 8,979,162 | B1 * | 3/2015 | Alasfour | B60N 2/245 296/65.03 |
| 9,126,522 | B1 * | 9/2015 | Perez | B60P 1/433 |
| 2004/0146386 | A1 * | 7/2004 | Goodrich | A61G 3/062 414/546 |
| 2005/0005722 | A1 * | 1/2005 | Nishimoto | F16H 19/04 74/422 |
| 2009/0323278 | A1 * | 12/2009 | Lu | H04M 1/0235 361/679.55 |
| 2014/0020606 | A1 * | 1/2014 | Benden | A47B 13/00 108/50.14 |
| 2014/0367976 | A1 * | 12/2014 | Kshirsagar | E05C 17/00 292/336.3 |

\* cited by examiner

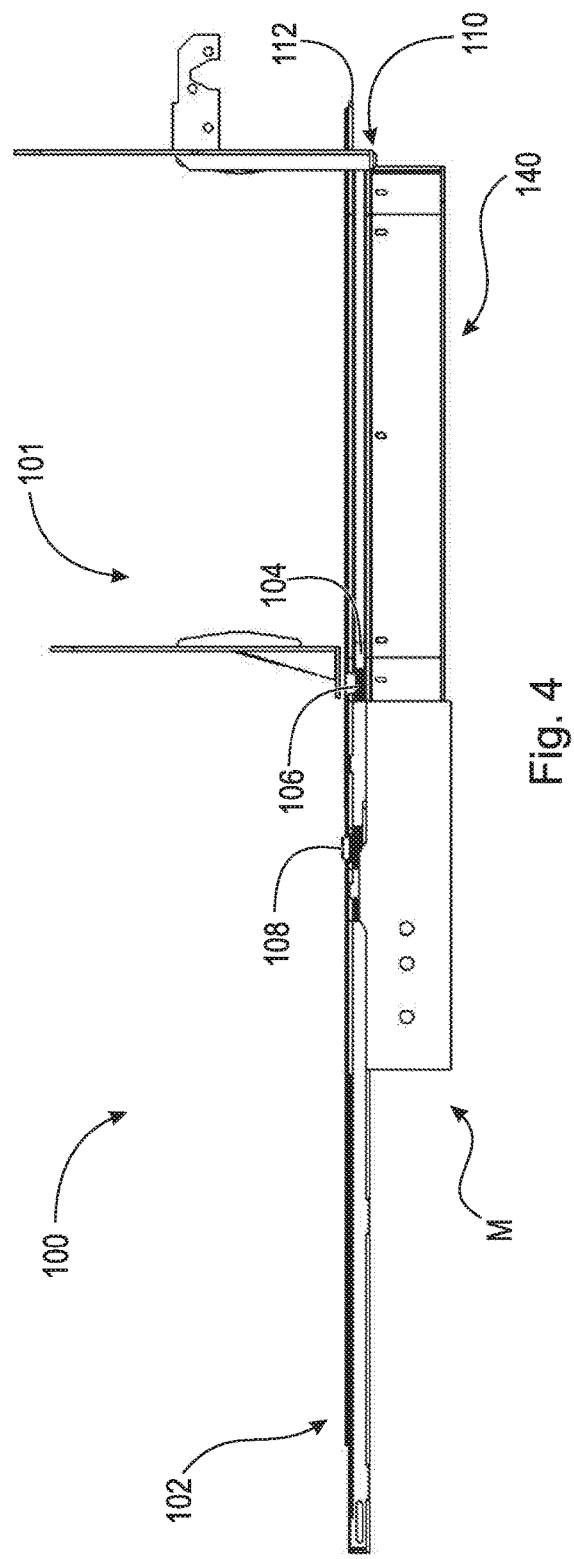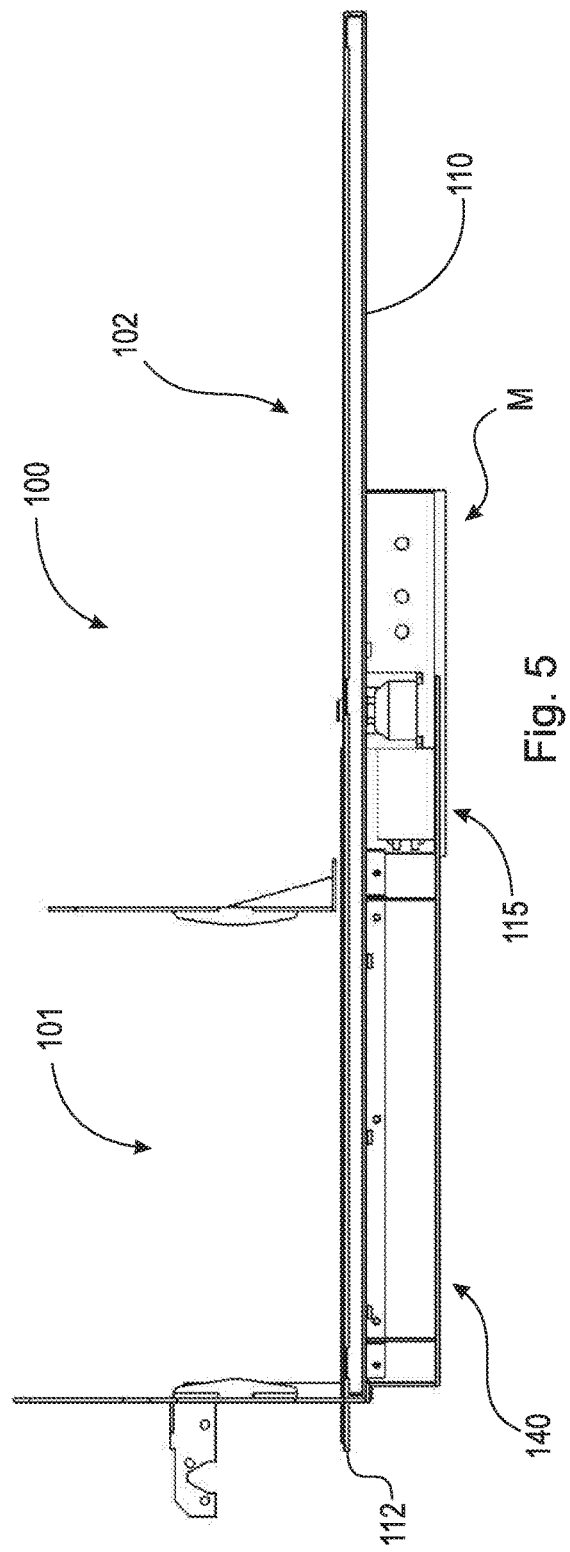

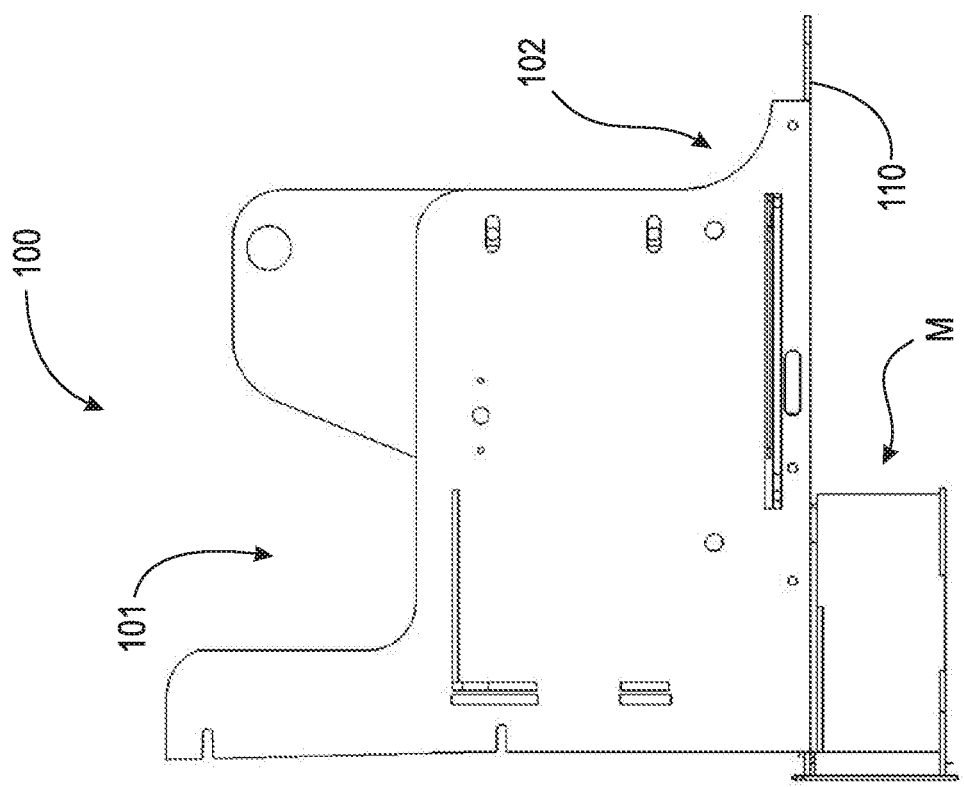
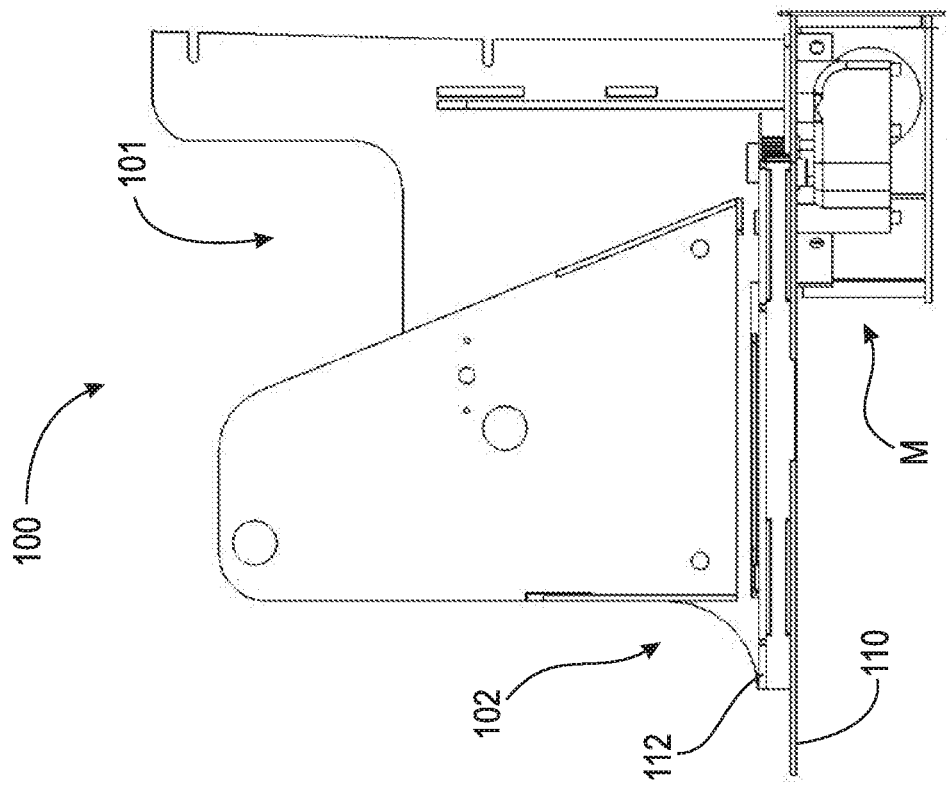

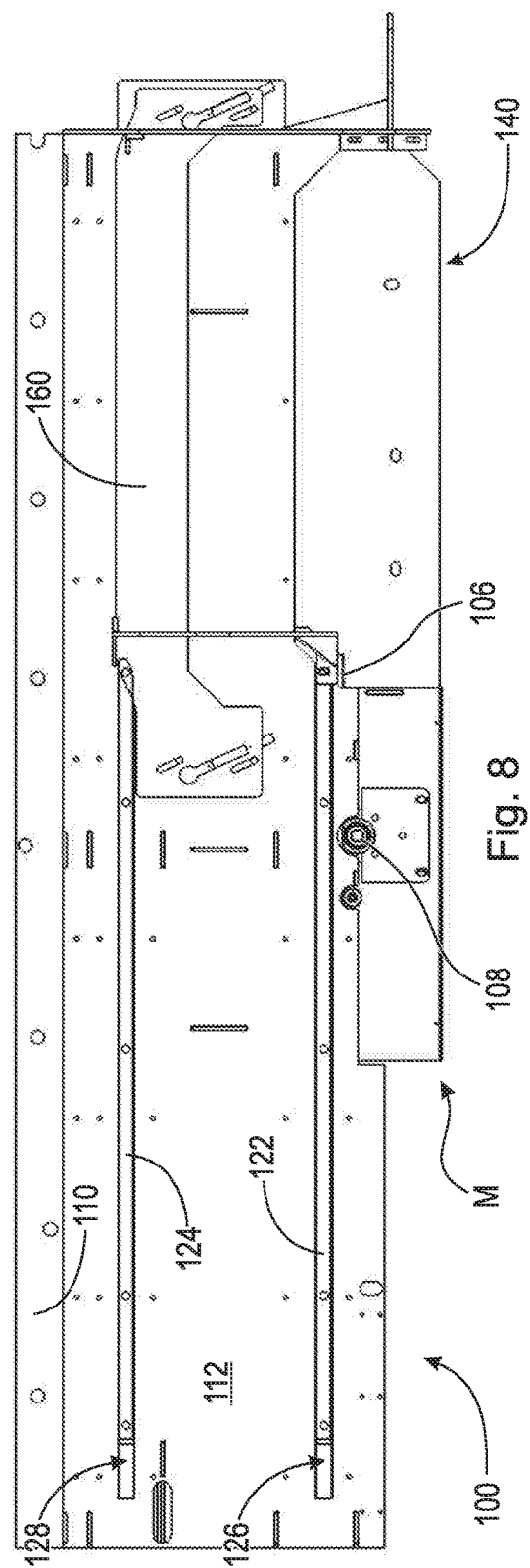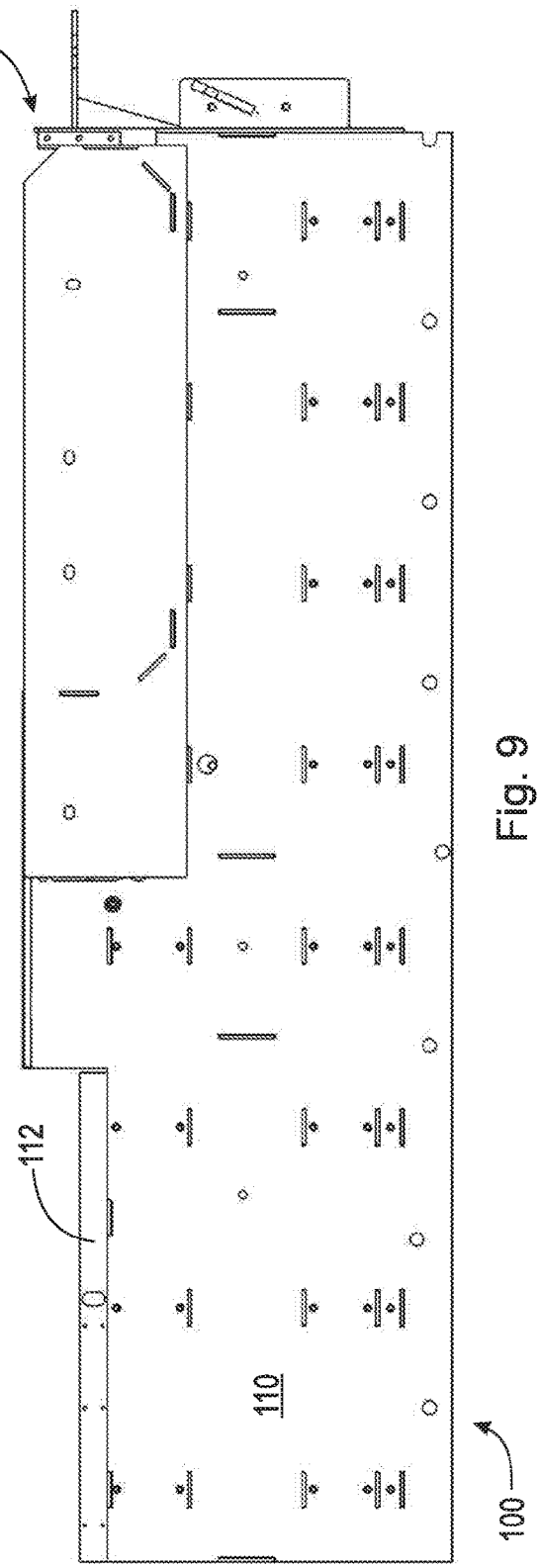

SHIFTABLE ASSEMBLY FOR A PLATFORM WHEELCHAIR LIFT

CROSS-REFERENCE TO RELATED APPLICATIONS

This application claims the benefit under 35 U.S.C. § 119(e) of U.S. Provisional Patent Application No. 62/395,771, filed Sep. 16, 2016, which application is incorporated herein by reference in its entirety.

FIELD

The present invention relates generally to internally mounted wheelchair lifts, and, more specifically, to internally mounted platform wheelchair lifts, and, even more specifically, to a shiftable assembly for an internally mounted platform wheelchair lift.

BACKGROUND

Typical wheelchair lifts are used to lift non-ambulatory passengers, while seated in their wheelchair, into a wheelchair accessible vehicle. Certain wheelchair lifts can be mounted proximate a side passenger door while other wheelchair lifts can be mounted through a rear cargo door. Single arm lifts are typically mounted proximate a side passenger door and used for lighter weight applications. Single arm lifts typically occupy less interior space and leave the passenger entry open however, single arm lifts are not suitable for significant lifting capacity. Dual-arm lifts are better suited for heavier loads since they include two arms to support and distribute the weight. Dual-arm lifts occupy more interior space than single arm lifts, block the side entrance, and limit the mobility of the front passenger seat. Dual parallel arm, solid platform lifts are more simple and reliable than single arm lifts. Dual parallel arm, solid platform lifts typically outperform single arm lifts in lifting capacity.

Public transportation vehicles are typically equipped with two separate doorways, one for ambulatory passengers and one for non-ambulatory passengers who require the use of a wheelchair lift. Unfortunately, public transportation vehicles are expensive to purchase, difficult to maneuver, and costly to maintain and operate.

Manufacturers have attempted to design wheelchair lifts which are sturdy and reliable yet also allow for the passage of ambulatory passengers such that two separate doorways are not required. One such lift is described in U.S. Pat. No. 7,815,413 (Ricon Corp.) including a wheelchair lift for use in conjunction with a vehicle having a floor. The lift includes a power-actuating system, a platform assembly having first and second platform sections, a linking assembly having first and second vertical arms connected to the platform assembly, and first and second fold-facilitating links connecting the first and second vertical arms, respectively, to the first and second platform sections. The linking assembly connects the power-actuating system to the platform assembly. During a folding process, the first and second fold-facilitating links cause the first platform section to pivot with respect to the second platform section and the first vertical arm to move with respect to the second vertical arm. A foldable platform is required since most vehicles have a limited amount of space between the passenger front seat and the passenger side rear wheel well fender. The lift described in the '413 patent contains an electro-hydraulic pump with a manual backup pump.

Wheelchair lifts that feature split, hinged, folding, and "wrap around" platforms have reduced lifting capacity and can pose tripping hazards. Additionally, these wheelchair lifts are complex so they are continually in need of maintenance or adjustment. Due to the number of parts, these wheelchair lifts are less reliable. Moreover, typically, these wheelchair lifts require extensive structural modifications to the vehicle and enlarging the standard door openings.

Therefore, there has been a long-felt need for a shiftable assembly for a platform wheelchair lift which occupies a small amount of floor space of a vehicle. There has been a long-felt need for a shiftable assembly for a platform wheelchair lift which does not obstruct the door opening when in a stored position. A shiftable assembly for a platform wheelchair lift which is simple, easy to manufacture, and easy to operate is needed. There has been a long-felt need for a shiftable assembly for a platform wheelchair lift including a platform wheelchair lift which does not need to be folded to be stored. A shiftable assembly for a platform wheelchair lift that is more compact, more efficient, and less expensive is needed for public transportation vehicles.

BRIEF SUMMARY

According to aspects illustrated herein, there is provided an assembly for shifting a wheelchair lift within a vehicle, comprising a housing arranged to be secured to a floor of the vehicle and extend substantially parallel relative to an opening of a side doorway in the vehicle, the housing comprising a bottom plate connected to a top plate and forming a first channel therebetween, a slidable member arranged within the first channel, and a means for displacing the slidable member along the first channel from a first position when stored to a second position in operation.

According to aspects illustrated herein, there is provided an assembly for shifting a wheelchair lift within a vehicle, comprising a housing arranged to be secured to a floor of the vehicle and extend substantially parallel relative to an opening of a side doorway in the vehicle, the housing comprising a bottom plate, a top plate connected to the bottom plate and forming a first channel and a second channel therebetween, the top plate comprising a first aperture, and a second aperture, a first slidable member arranged within the first channel, a second slidable member arranged within the second channel, and a means for displacing the first and second slidable members along the first and second channels, respectively, from a first position when stored to a second position in operation.

According to aspects illustrated herein, there is provided an assembly for shifting a wheelchair lift within a vehicle, comprising a housing arranged to be secured to a floor of the vehicle and extend substantially parallel relative to an opening of a side doorway in the vehicle, the housing comprising a bottom plate connected to a top plate and forming at least one channel therebetween, at least one slidable member arranged within the at least one channel, and a means for displacing the at least one slidable member along the at least one channel from a first position when stored to a second position in operation.

In an example embodiment, the means includes a gear rack fixedly secured to the slidable member and a gear arranged to engage the gear rack and displace the slidable member along the channel between the first and second positions.

One object is to provide a shiftable assembly for a platform wheelchair lift which occupies a small amount of floor space of a vehicle.

Another object is to provide a shiftable assembly for a platform wheelchair lift which does not obstruct the door opening when in a stored position.

Still another object is to provide a shiftable assembly for a platform wheelchair lift which is simple, easy to manufacture, and easy to operate.

Yet another object is to provide a shiftable assembly for a platform wheelchair lift including a platform wheelchair lift which does not need to be folded to be stored.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 4 is a front elevational view of the assembly of FIG. 3;

FIG. 5 is a rear elevational view of the assembly of FIG. 3;

FIG. 6 is a left side elevational view of the assembly of FIG. 3;

FIG. 7 is a right side elevational view of the assembly of FIG. 3;

FIG. 8 is a top plan view of the assembly of FIG. 3;

FIG. 9 is a bottom view of the assembly of FIG. 3;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. Throughout the description herein, it should be understood that any wheelchair lift can be used with assembly 100. For example, although the figures illustrate a wheelchair lift available from BraunAbility located at 631 W 11$^{th}$ Street, Winamac, Ind. 46996, any suitable wheelchair lift or ramp is contemplated.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
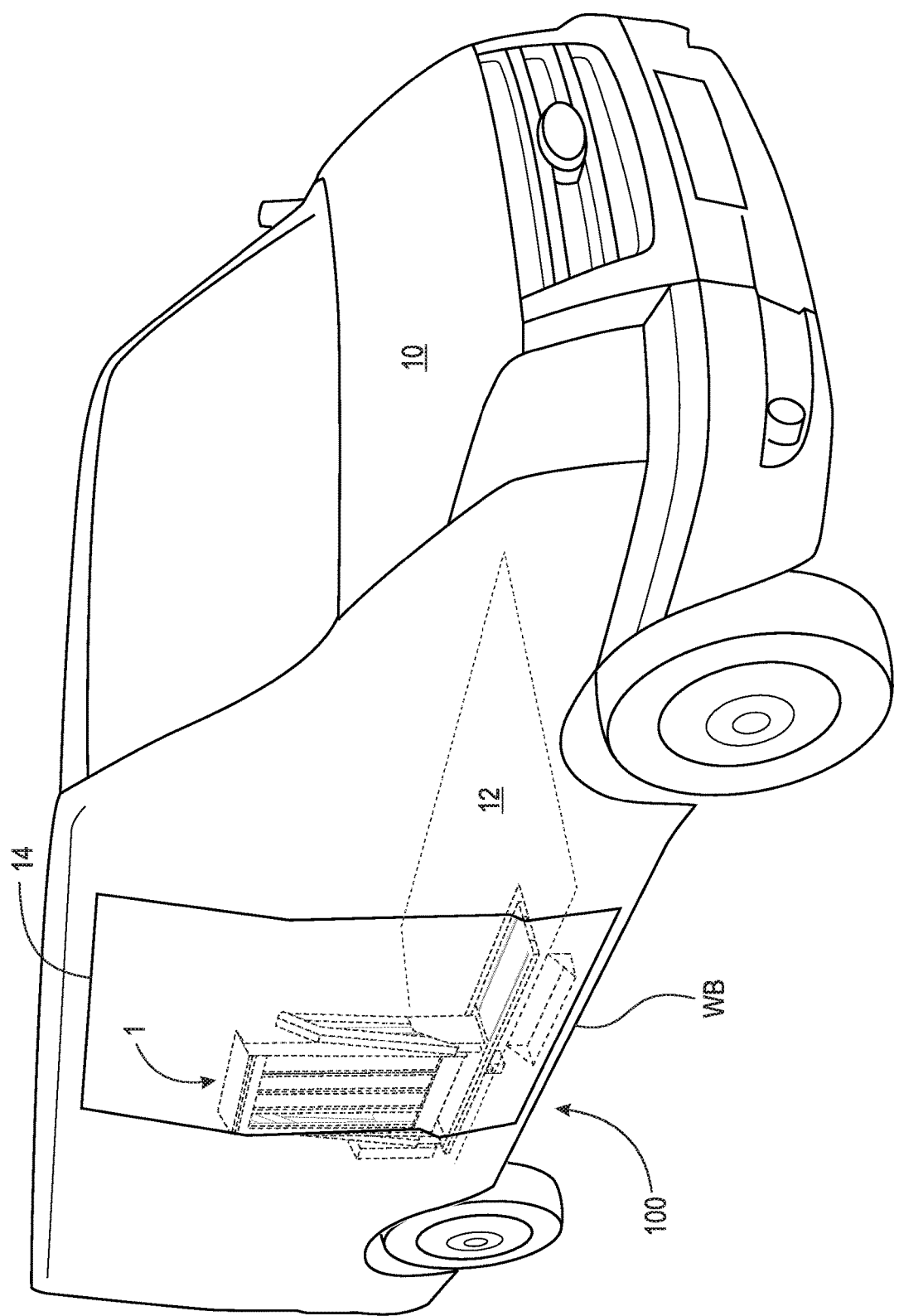
FIG. 1 is a perspective view of a shiftable assembly for a platform wheelchair lift.
Figure 2A:
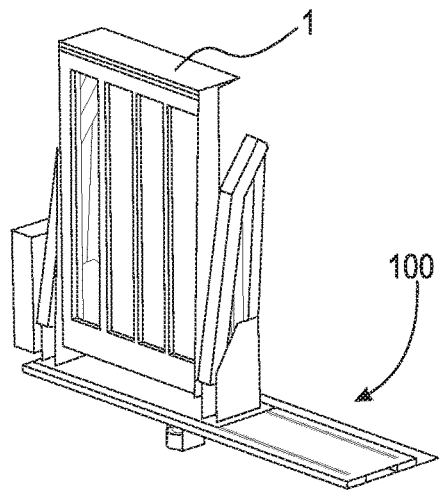
FIG. 2A is a perspective view of parts of the assembly of FIG. 1 including a wheelchair lift in isolation in a stored position.
Figure 2B:
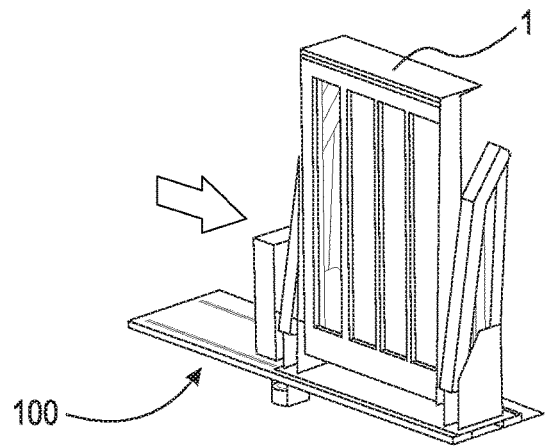
FIG. 2B is a perspective view of the assembly of FIG. 2A in a first position.
Figure 2C:
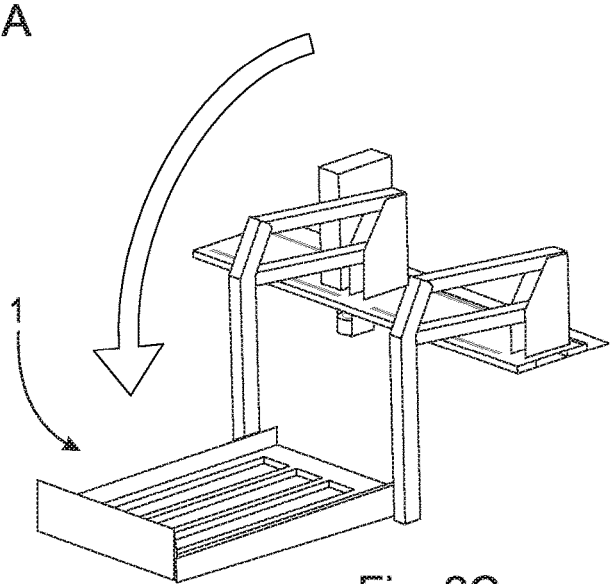
FIG. 2C is a perspective view of the assembly of FIG. 2B including a wheelchair lift in an extended position.
Figure 2D:
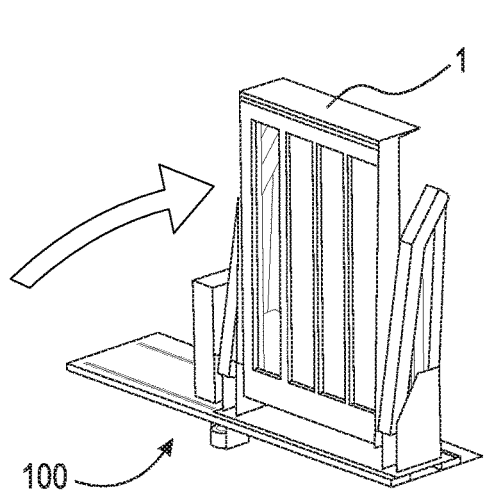
FIG. 2D is a perspective view of the assembly similar to the view shown in FIG. 2B.
Figure 2E:
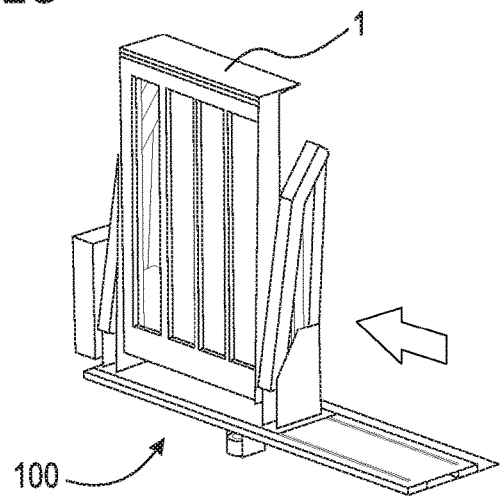
FIG. 2E is a perspective view of the assembly similar to the view shown in FIG. 2A.

Adverting now to the Figures, FIG. 1 depicts assembly 100 installed within vehicle 10 including wheelchair lift 1. Assembly 100 is bolted to the vehicle structure and a lift base of lift 1. Assembly 100 is designed to shift wheelchair lift 1 within vehicle 10 from a stored position shown in FIG. 1 to a second position in use such that wheelchair lift 1 can be extended and retracted. FIGS. 2A through 2E schematically depict a sequence of positions for assembly 100 including wheelchair lift 1. In FIG. 2A, wheelchair lift 1 is in a stored position. In FIGS. 2B, 2C, and 2D, wheelchair lift 1 is in use and assembly 100 is shifted to the right. In FIG. 2E, wheelchair lift 1 is in a stored position again and assembly 100 is shifted to the left. Assembly 100 is intended to shift any wheelchair lift 1 along wheel base WB. In the stored position, assembly 100 provides an opening that is approximately 30" for ambulatory passenger to enter or exit the vehicle.

Figure 3:
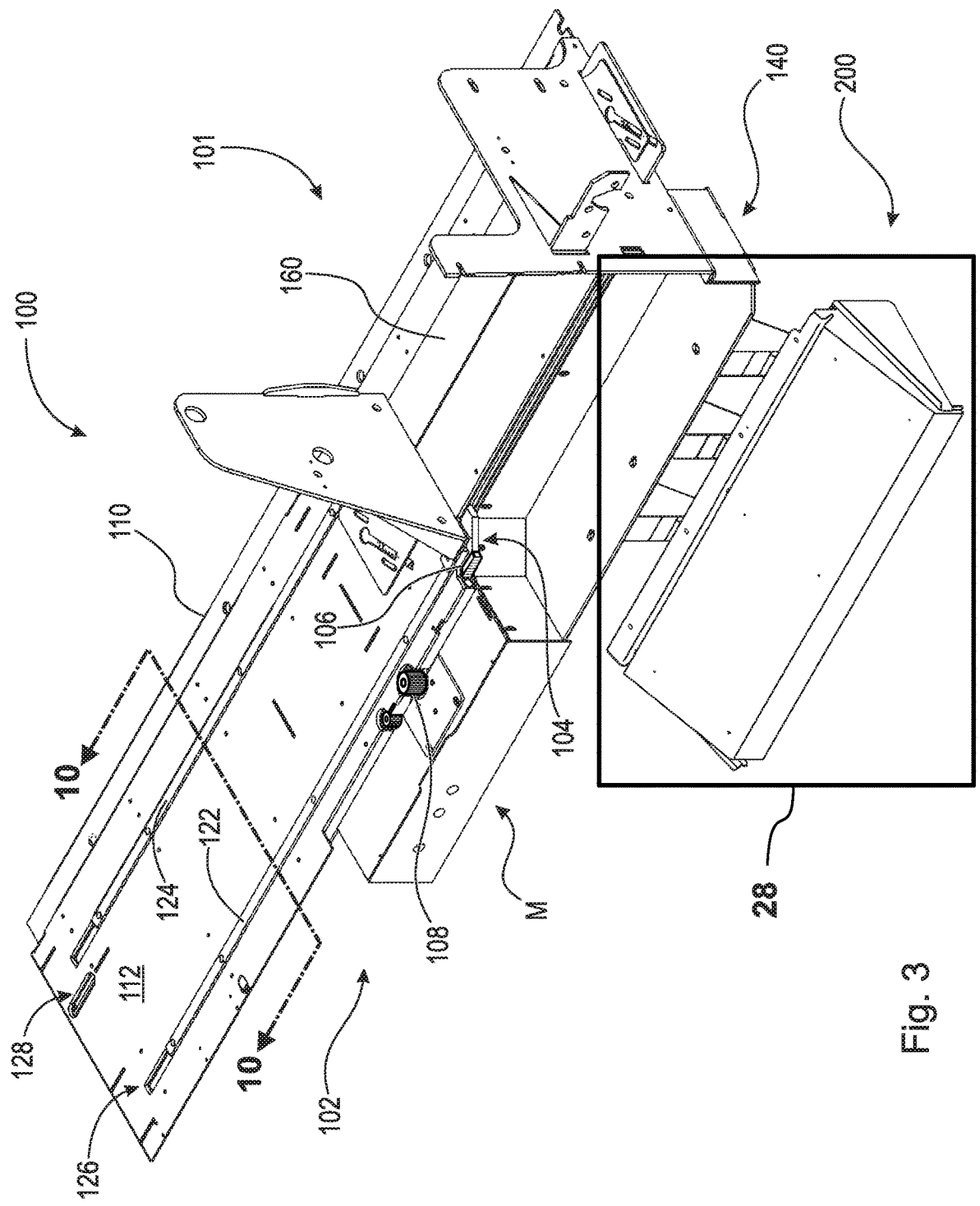
FIG. 3 is a perspective view of a shiftable assembly in isolation.

FIG. 3 illustrates assembly 100 in a front perspective view with vehicle 10 omitted.

FIG. 4 illustrates a front elevational view of assembly 100 shown in FIG. 3.

FIG. 5 illustrates a rear elevational view of assembly 100 shown in FIG. 3.

FIG. 6 illustrates a left side elevational view of assembly 100 shown in FIG. 3.

FIG. 7 illustrates a right side elevational view of assembly 100 shown in FIG. 3.

FIG. 8 illustrates a top plan view of assembly 100 shown in FIG. 3.

FIG. 9 illustrates a bottom plan view of assembly 100 shown in FIG. 3.

Figure 10:
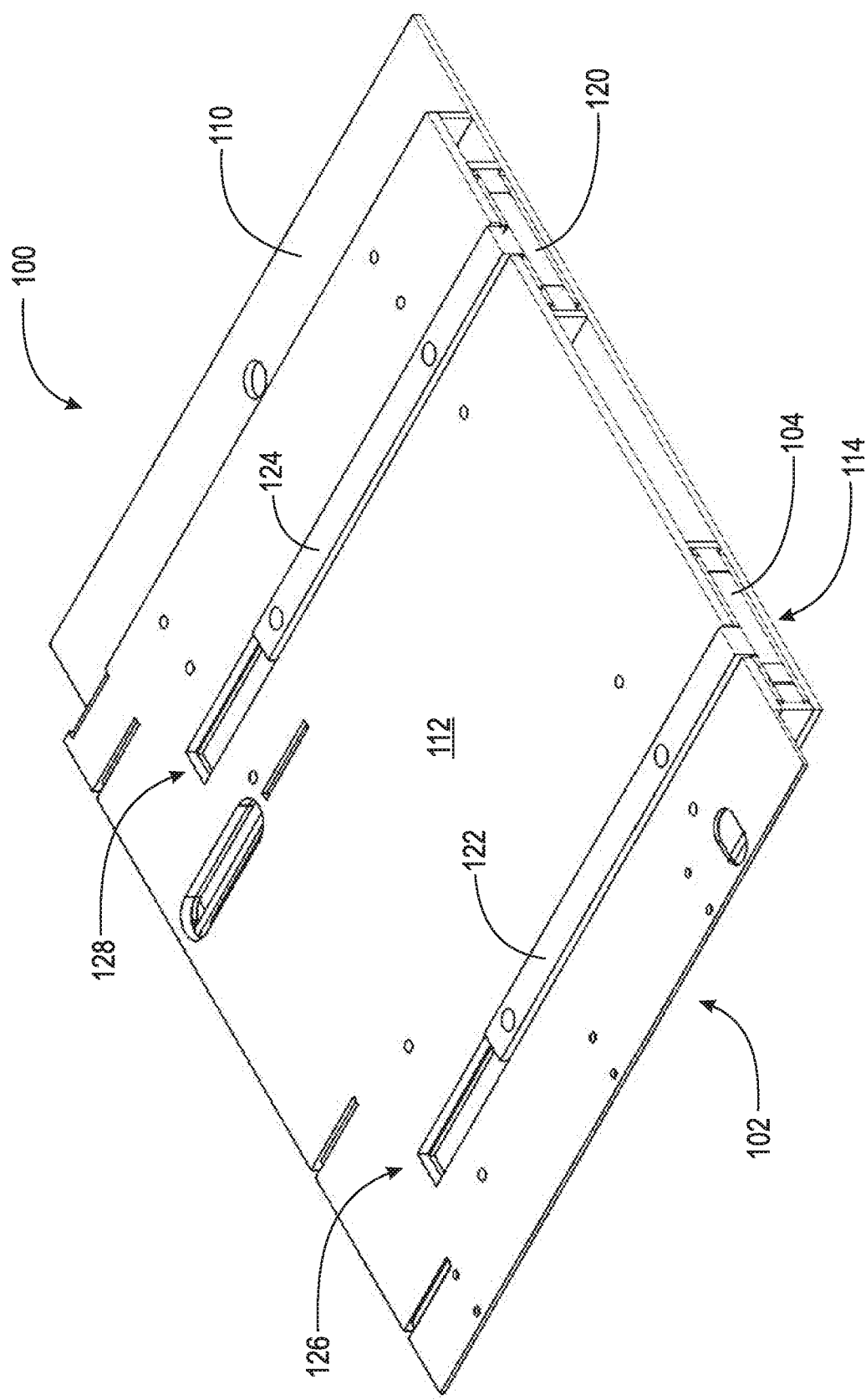
FIG. 10 is a cross-sectional view of the assembly taken generally along line 10-10 in FIG. 3.

FIG. 10 illustrates a cross-sectional view of assembly 100 taken generally along line 10-10 in FIG. 3. The following should be viewed in light of FIGS. 1-10. Assembly 100 includes housing 102 arranged to be secured to floor 12 of vehicle 10. Assembly 100 extends parallel relative to opening 14 of a side doorway in vehicle 10. Assembly 100 broadly includes housing 102, slidable member 104, and means M arranged to displace slidable member 104 along housing 102. Housing 102 includes bottom plate 110 connected to top plate 112 and channel 114 is formed therebetween. Slidable member 104 is arranged within channel 114 and displaceable by any suitable means M. Channel 114 extends between the end of housing 102 which is proximate the rear wheels of vehicle 10 and the end of housing 102 which is proximate the front wheels of vehicle 10. Slidable member 104 is necessarily shorter than channel 114 so that it is displaceable between the end of housing 102 proximate the rear wheels of vehicle 10 and the end of housing 102 proximate the front wheels of vehicle 10.

Means M can include gear rack 106 fixedly secured to slidable member 104 and gear 108 arranged to engage gear rack 106 and displace slidable member 104 along channel 114. Gear 108 can be operated by motor 115. It should be understood that although a gear rack and gear are depicted, the assembly is not so limited. Any suitable linear actuator is contemplated. For example, instead of a rack and pinion, a screw drive, or any hydraulic means can be used. In an example embodiment, gear rack 106 can be fixedly secured to slidable member 104 which includes upward facing teeth and gear 108 can be arranged vertically to engage the upward facing teeth of gear rack 106. In such an embodiment, gear 108 and motor 115 is fixed atop top plate 112 next to wheelchair lift 1 rather than alongside top plate 112.

Motor 115 can be any suitable motor, for example, a tarp gear motor having a model number of 5541095 available from Buyers Products Company is suitable. Motor 115 can be housed within housing 102.

In an example embodiment, assembly 100 includes slidable member 120 in addition to slidable member 104. Wheelchair lift 1 can be secured to both slidable members 104 and 120 via supports 122 and 124. In an example embodiment, slidable members 104 and 120 are independent of each other. When lift 1 is fixedly secured to slidable members 104 and 120, slidable member 120 is displaced when slidable member 104 is displaced by means M. Support 122 is fixedly secured to slidable member 104 and extends upwardly through channel 126 in top plate 112. Support 124 is fixedly secured to slidable member 120 and extends upwardly through channel 128 in top plate 112. In an example embodiment, slidable members 104 and 120 are connected rather than independent of each other.

In an example embodiment, assembly 100 also includes load transfer assembly 101, step well 140, and step assembly 200 which are described further below.

Figure 11:
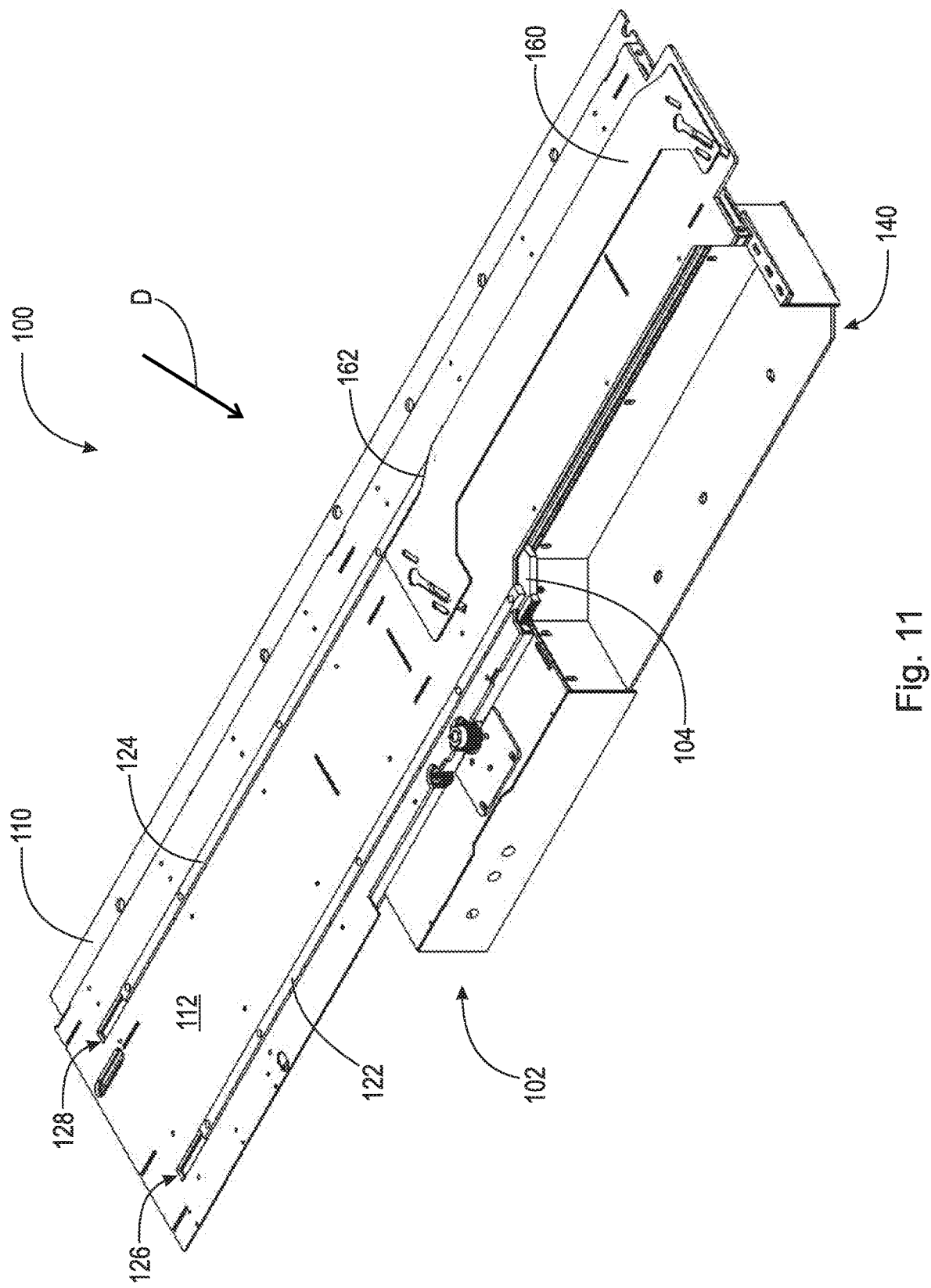
FIG. 11 is a perspective view of the assembly, like the view shown in FIG. 3 except the load transfer assembly is omitted.

FIG. 11 is a perspective view of assembly 100 omitting load transfer assembly 101 and step assembly 200. In FIG. 11, slide plate 160 is illustrated.

Figure 12:
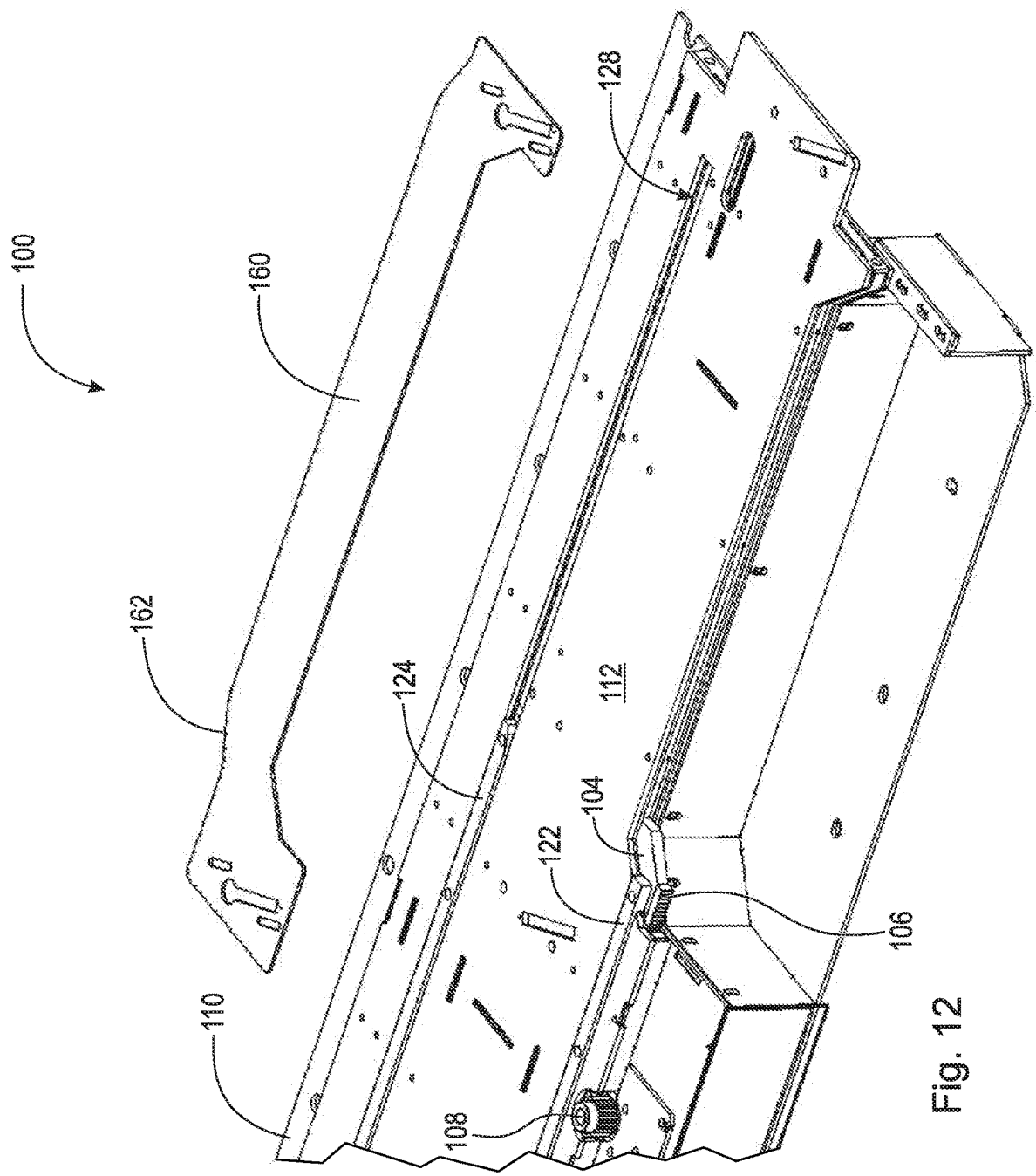
FIG. 12 is an enlarged, partial exploded front perspective view of part of the assembly of FIG. 11 including the slide plate exploded away from the assembly.

FIG. 12 is a perspective view of assembly 100 shown in FIG. 11 except slide plate 160 is suspended above.

Figure 13:
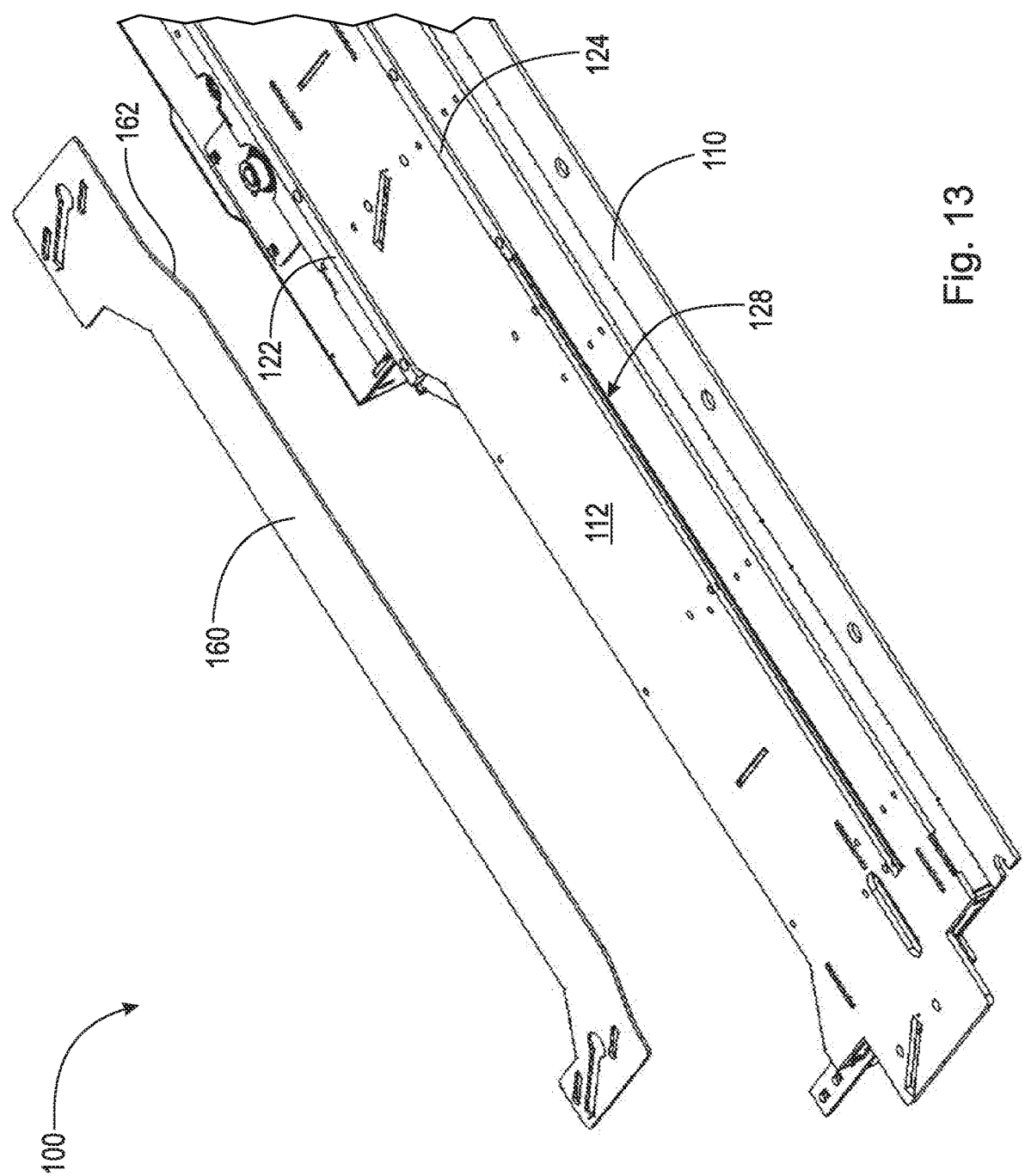
FIG. 13 is an enlarged, partial exploded rear perspective view of part of the assembly of FIG. 11 including the slide plate exploded away from the assembly.

In FIG. 13, assembly 100 shown in FIG. 12 is illustrated from a rear perspective. The following should be viewed in light of FIGS. 11-13. In an example embodiment, assembly 100 includes slide plate 160 secured atop top plate 112. When assembly 100 is in the stored position, slide plate 160 is spring-loaded in the position shown in FIG. 11. When assembly 100 is activated and lift 1 is displaced from the stored position, support 124, which is atop slidable member 120, contacts and slides along ramp surface 162 and urges slide plate 160 in direction D shown. Slide plate 160 serves to cover a portion of channel 128 which spans the side doorway of the vehicle when ambulatory passengers are entering and exiting the vehicle and assembly 100 is in the stored position.

Figure 14:
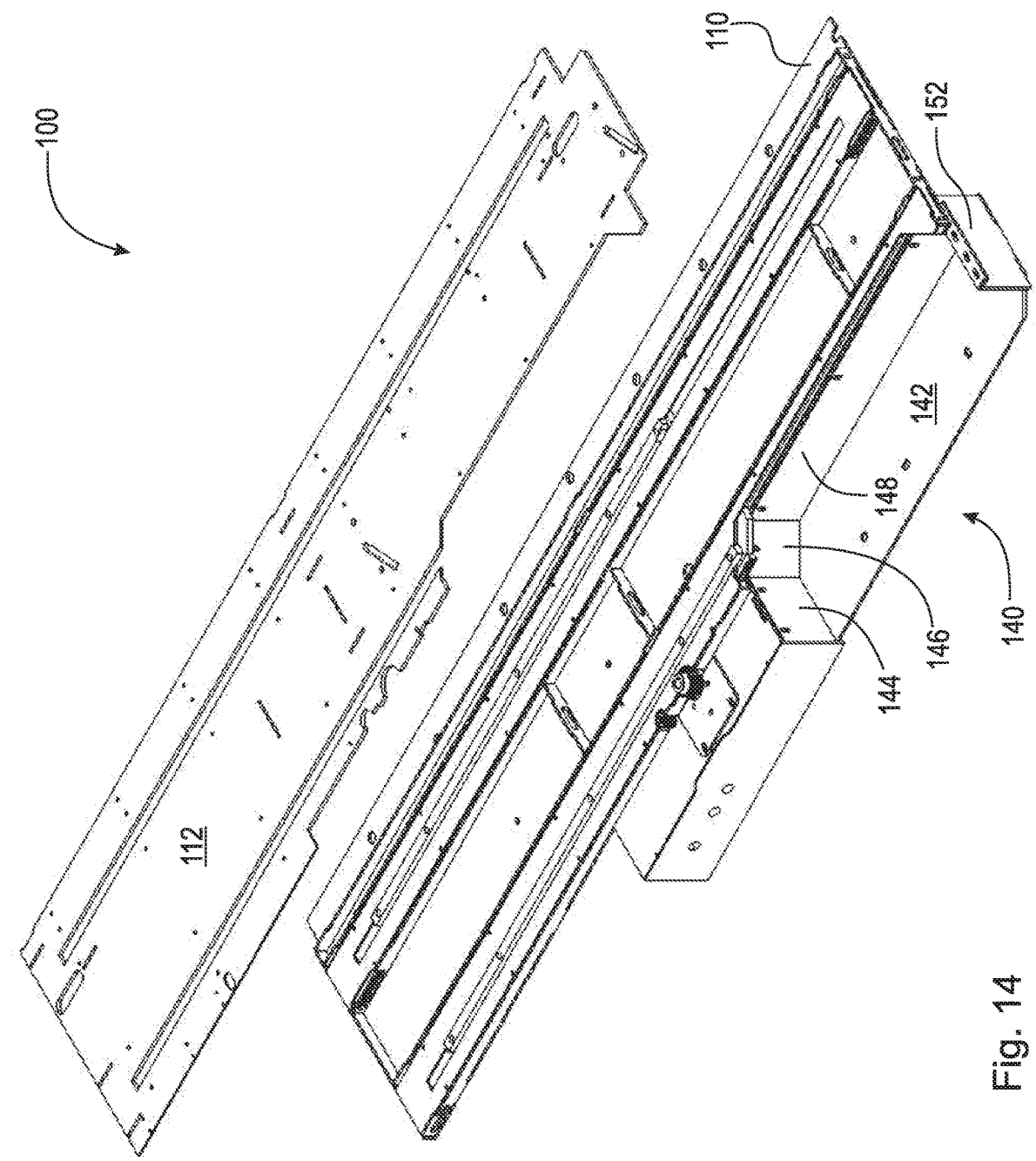
FIG. 14 is a partial exploded front perspective view of the assembly of FIG. 11 including the top plate exploded away from the assembly.

FIG. 14 illustrates a partial exploded front perspective view of assembly 100 shown in FIG. 11 including top plate 112 suspended above. In an example embodiment, assembly 100 includes step well 140 positioned to facilitate ambulatory users when entering and exiting vehicle 10 through side opening 14. Step well 140 is also shown in further detail in FIGS. 20 and 21. Step well 140 includes plate 142 which is recessed relative to housing 102 of assembly 100. Plate 142 is parallel relative to bottom plate 110. Additionally, step well 140 includes a plurality of plates which extend between bottom plate 110 and plate 142 to provide support. The plurality of plates includes some or all of plates 144, 146, 148, 150, and 152. Plates 144, 146, 148, 150, and 152 can be integral or independent of each other. In an example embodiment, plates 146 and 150 are arranged at an angle. For example, plate 146 extends from an end of plate 144 toward plate 148 at a 45 degree angle. Similarly, plate 150 extends from an end of plate 148 toward plate 152 at a 45 degree angle.

Figure 15:
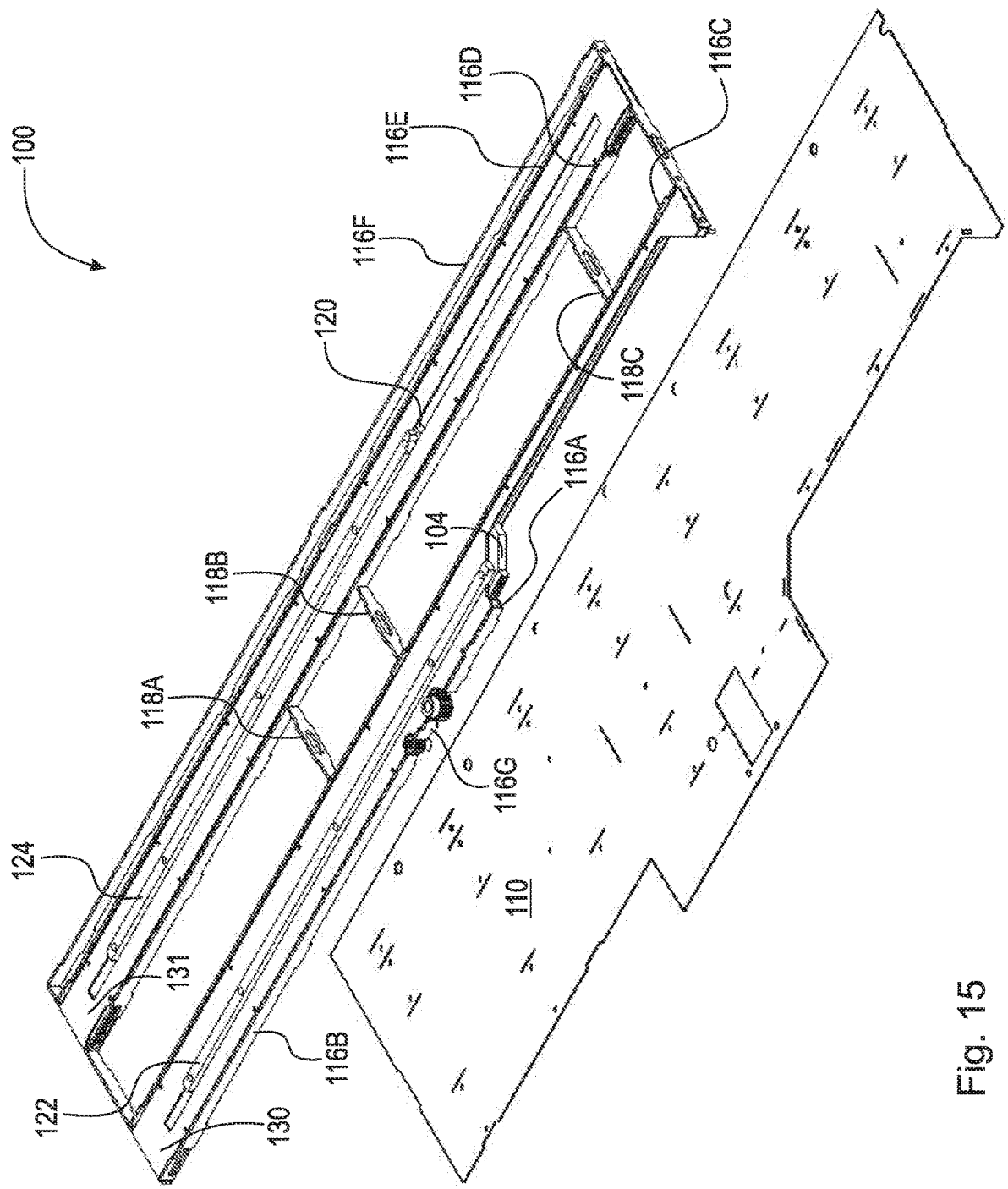
FIG. 15 is a partial exploded front perspective view of the assembly of FIG. 14 with the bottom plate exploded away from the assembly.

FIG. 15 is a partial exploded front perspective view of assembly 100 shown in FIG. 14 with bottom plate 110 recessed below. In an example embodiment, top plate 112 is separated from bottom plate 110 by longitudinally arranged vertical plates 116A, 116B, 116C, 116D, 116E, 116F, and 116G. In an example embodiment, vertical plates 116A and 116B are co-planar and arranged on either side of gear 108. Vertical plate 116G is arranged between plates 116A and 116B. Plates 116C, 116D, 116E, and 116F are parallel with each other and relative to plates 116A, 116B, and 116G. In an example embodiment, top plate 112 is separated from bottom plate 110 by laterally arranged vertical plates 118A, 118B, and 118C. In an example embodiment, vertical plates 118A, 118B, and 118C are parallel with each other and arranged perpendicular relative to vertical plates 116A, 116B, 116C, 116D, and 116E.

Figure 16:
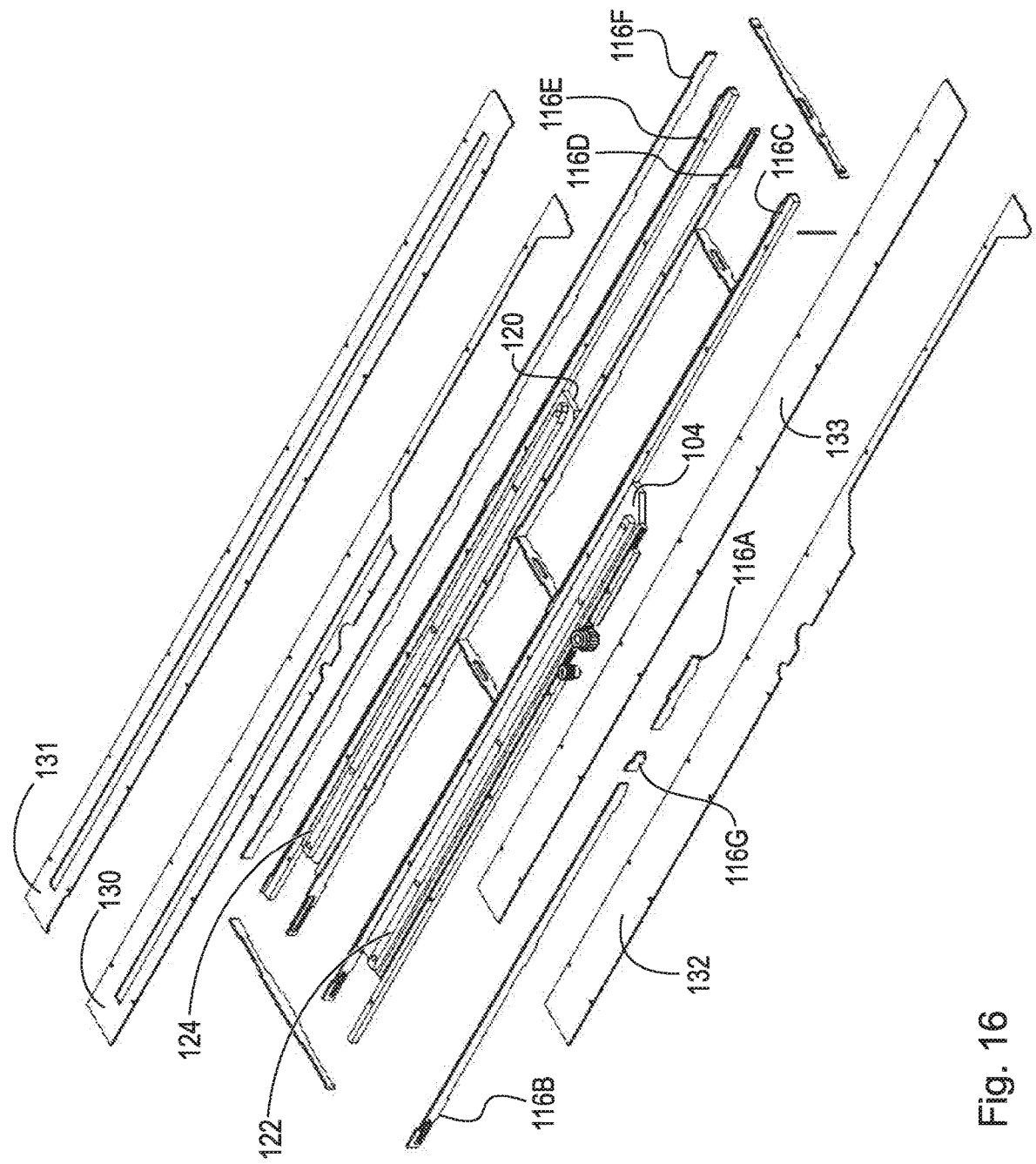
FIG. 16 is a partial exploded front perspective view of the assembly of FIG. 15, except the bottom plate is omitted.

FIG. 16 is a partial exploded front perspective view of assembly 100 shown in FIG. 15, except bottom plate 110 is omitted. In an example embodiment, slidable members 104 and 120 are coated with a surface coating which provides optimal surface hardness, resists corrosion, and reduces friction, for example, a chromium coating. One example suitable coating is a thin dense chrome coating, called Armoloy TDC by The Armoloy Corporation of DeKalb, Ill. Sandwiched between slidable member 104 and top plate 112 is upper layer 130 made of any suitable nylon plastic, for example, a Nylatron brand nylon plastic which is typically filled with a suitable molybdenum disulfide lubricant powder. Lower layer 132 is identical to upper layer 130 and sandwiched between slidable member 104 and bottom plate 110. Advantageously, the combination of the surface coating and the layers of nylon plastic is provided for lubricity and allows slidable member 104 to slide along channel 114 with minimal wear. Slidable member 120 is equally equipped with upper and lower layers, 131 and 133, respectively, which provide the same functionality as upper and lower layers 130 and 132, respectively.

Figure 17:
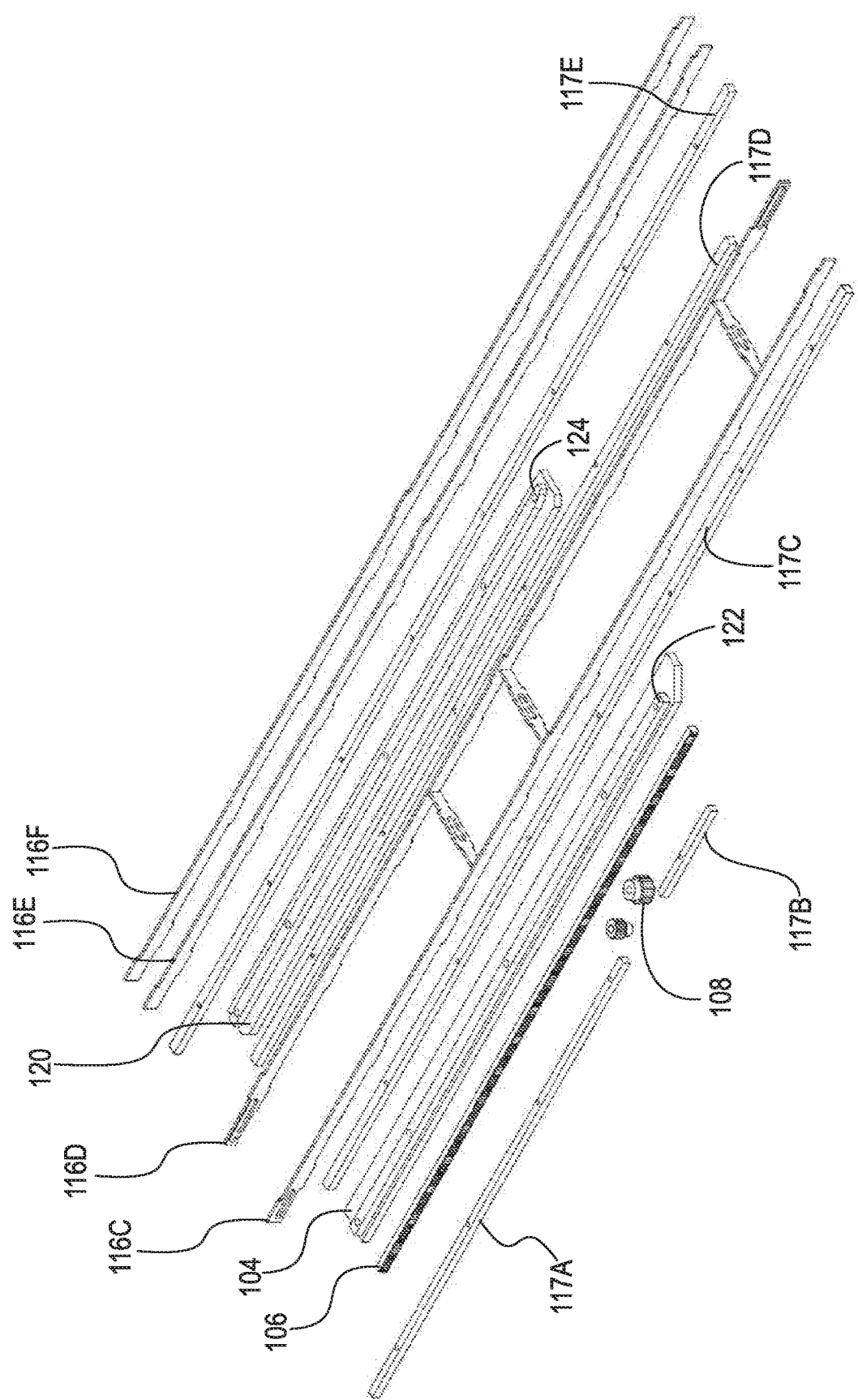
FIG. 17 is a partial exploded front perspective view of components of the assembly of FIG. 16 in isolation.

FIG. 17 is a partial exploded front perspective view of components of assembly 100 shown in FIG. 16 in isolation. In addition to the longitudinal and laterally arranged vertical plates illustrated, spacers 117A, 117B, 117C, 117D, and 117E are shown as well.

Figure 18:
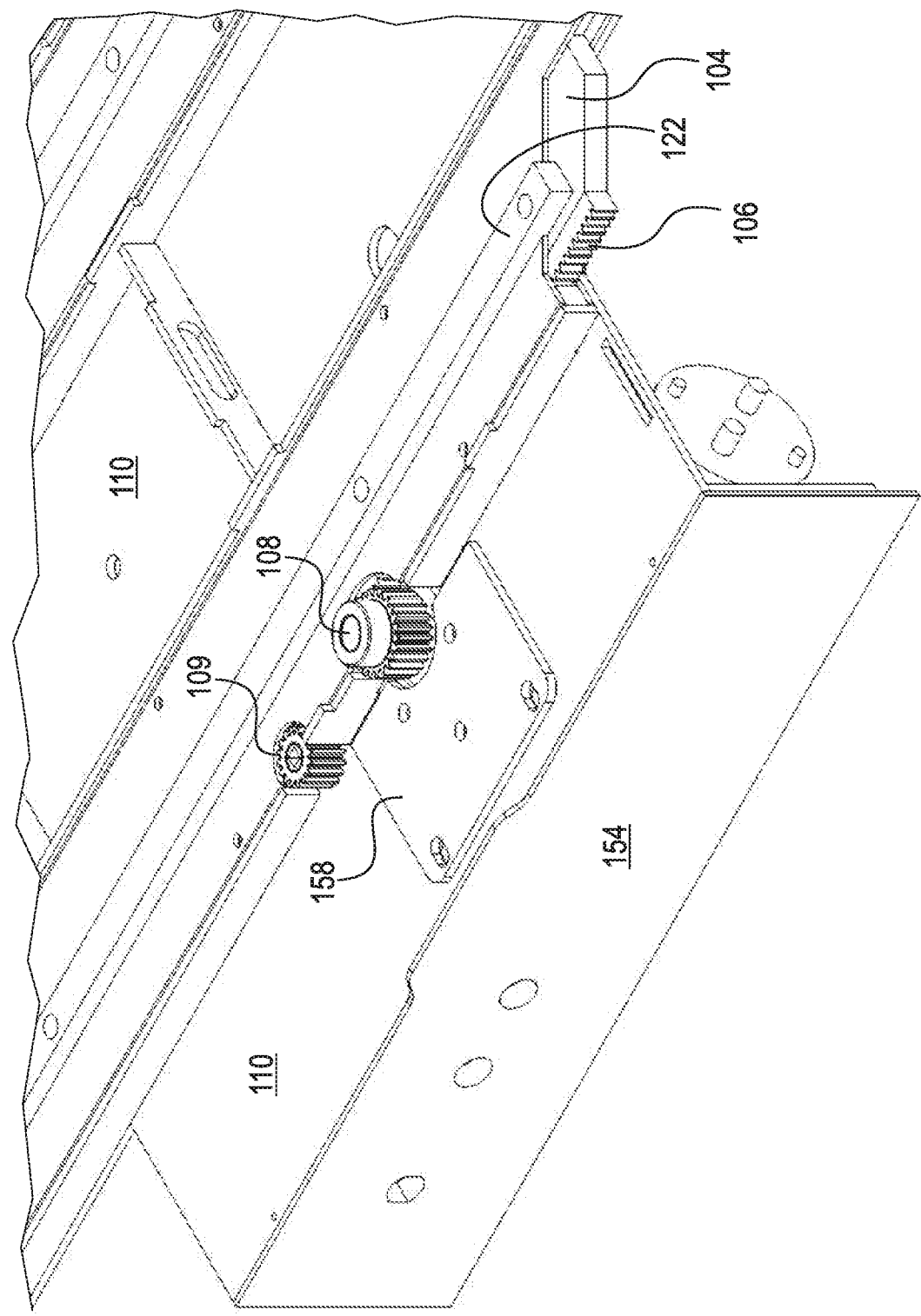
FIG. 18 is an enlarged front perspective view of the motor housing of the assembly of FIG. 11.

FIG. 18 is an enlarged front perspective view of the motor housing of assembly 100 of FIG. 11.

Figure 19:
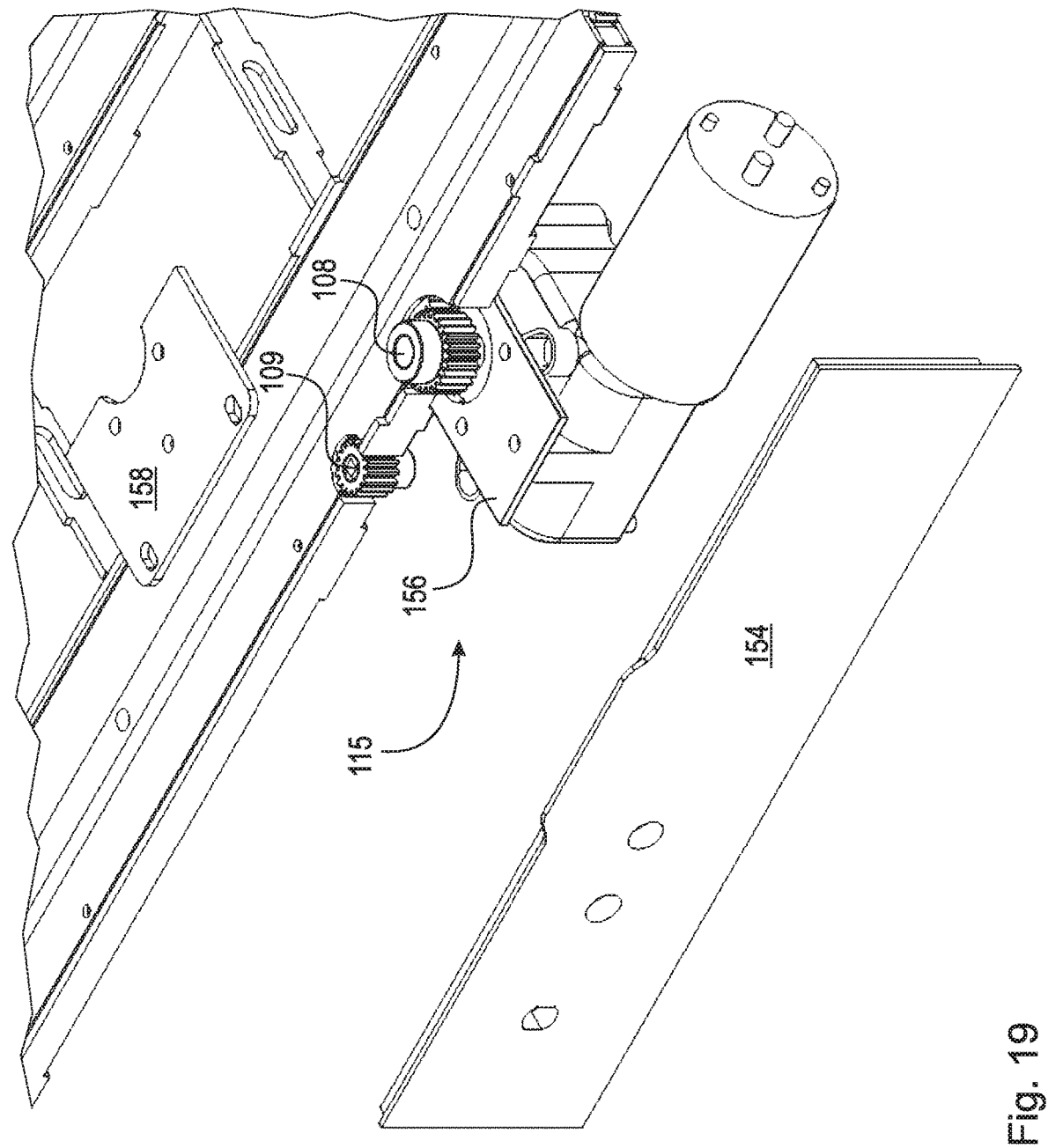
FIG. 19 is a partial exploded view of the motor shown in FIG. 18, except the bottom plate of housing is omitted.

FIG. 19 is a partial exploded view of motor 115 shown in FIG. 18, except bottom plate 110 of housing 102 is omitted. In an example embodiment, housing 102 includes motor cover 154, motor top plate 156, and motor plate 158. Manual gear 109 is illustrated and allows an operator to displace slidable members 104 and 120 without the use of motor 115.

Figure 20:
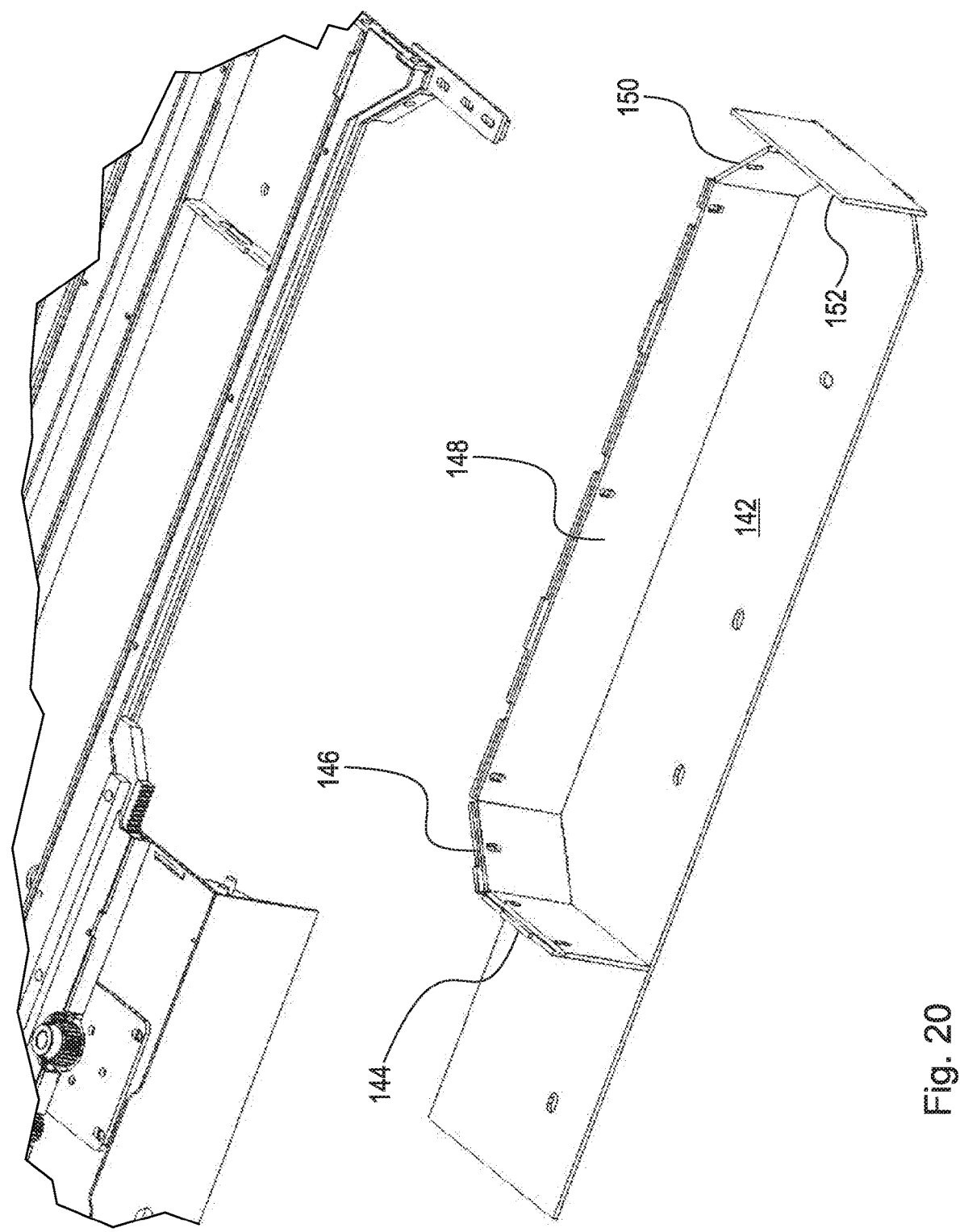
FIG. 20 is an enlarged partial exploded front perspective view of the step well of the assembly of FIG. 11.
Figure 21:
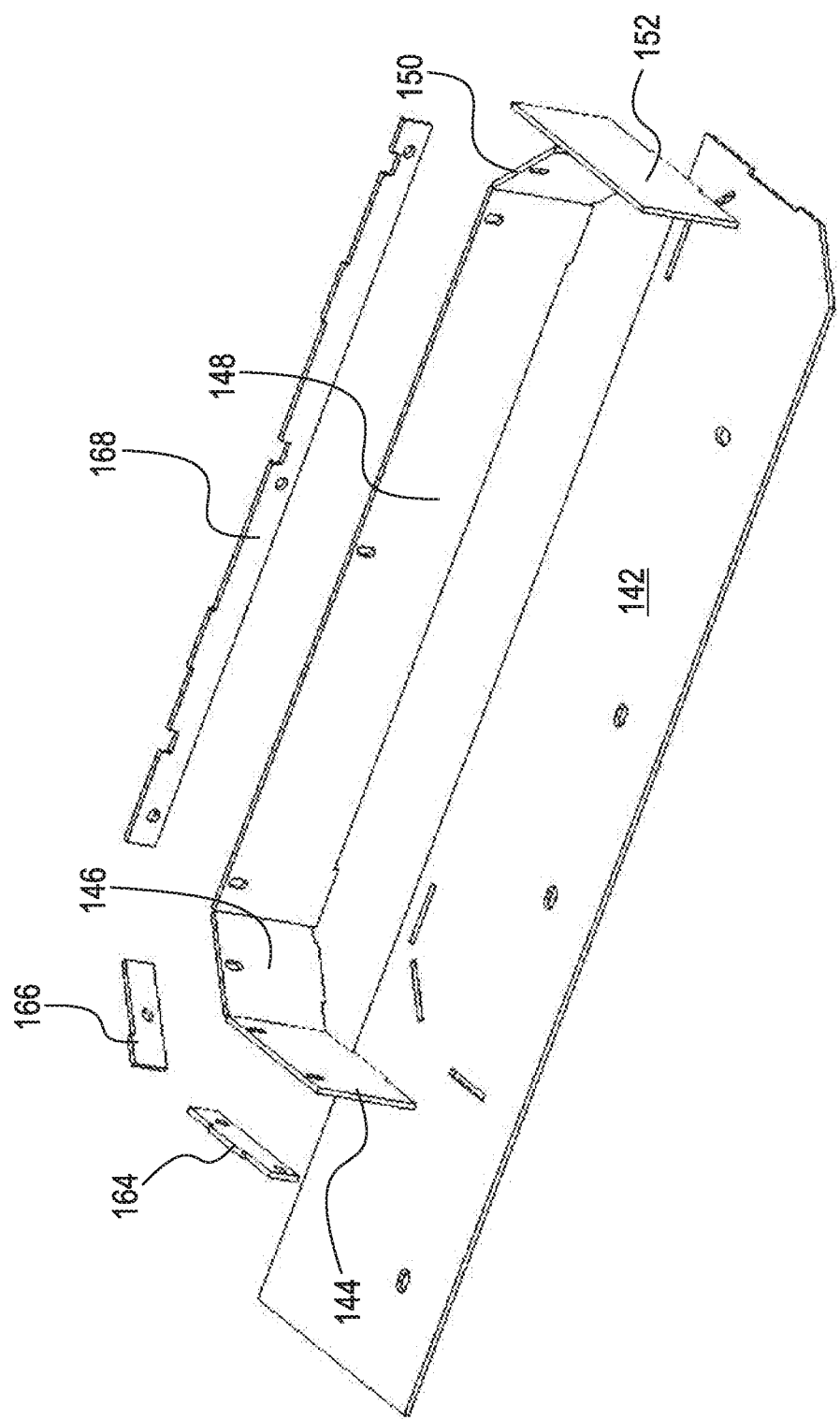
FIG. 21 is an exploded front perspective view of the step well of FIG. 20 in isolation.

Step well 140 is illustrated in FIGS. 20 and 21. Brackets 164, 166, and 168 can be used to secure plates 144, 146, 148, 150, and 152 within assembly 100.

Figure 22:
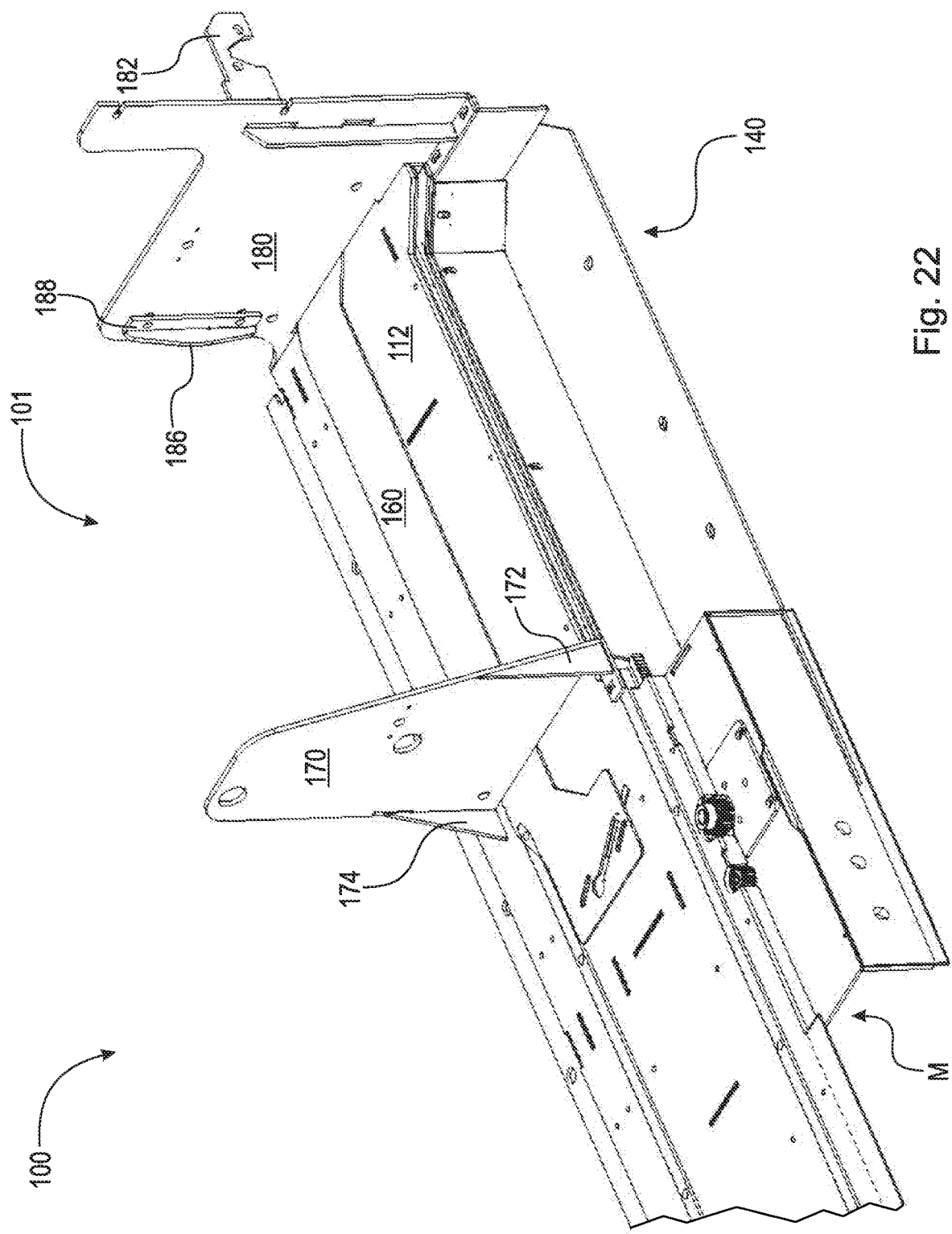
FIG. 22 is a front left perspective view of the assembly as shown in FIG. 3 focusing on the load transfer assembly.

FIG. 22 illustrates a front left perspective view of assembly 100 including load transfer assembly 101 and step well 140.

Figure 23:
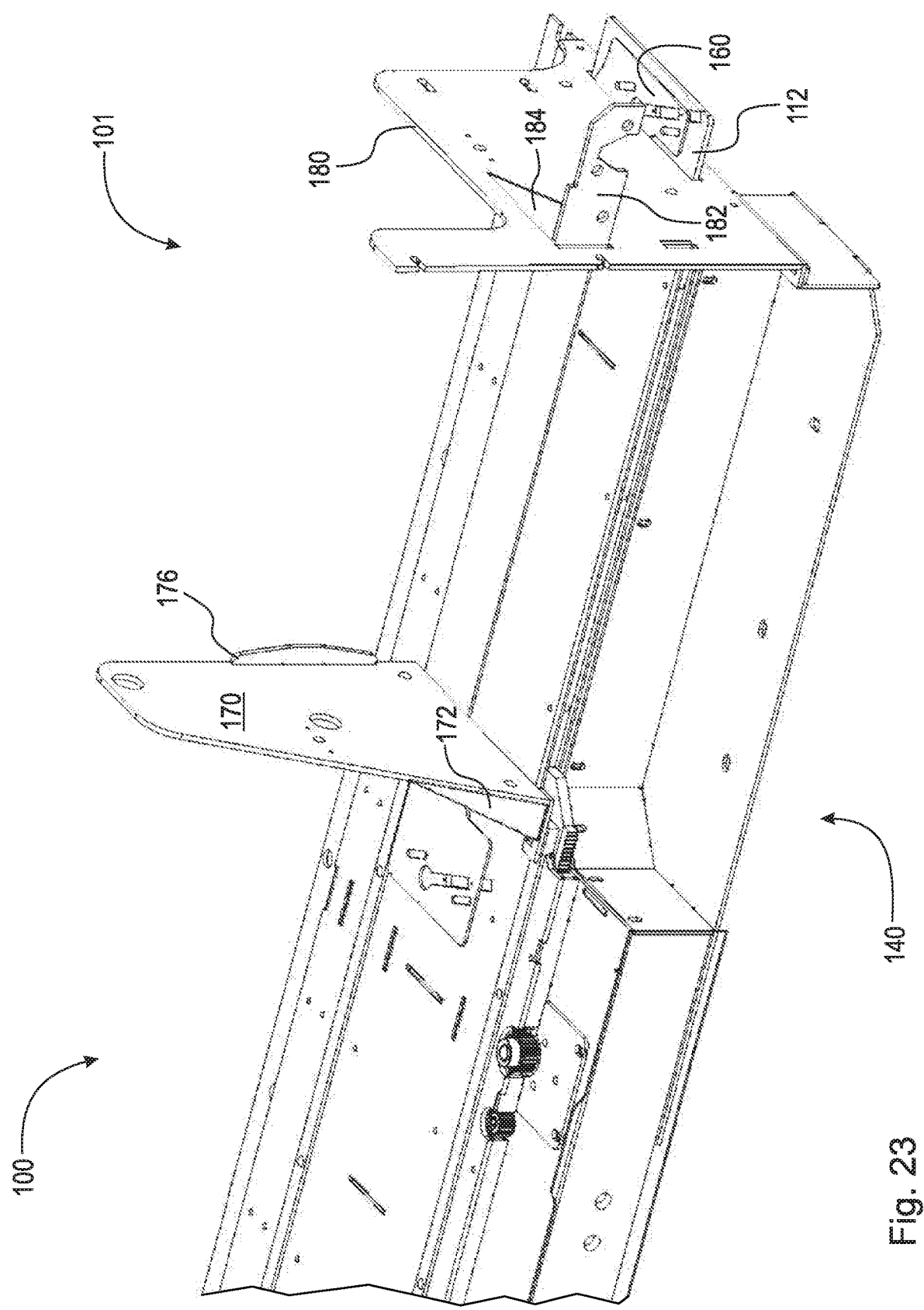
FIG. 23 is a front right perspective view of the assembly as shown in FIG. 3 focusing on the load transfer assembly.

FIG. 23 is a front right perspective view of assembly 100 including load transfer assembly 101 and step well 140.

Figure 24:
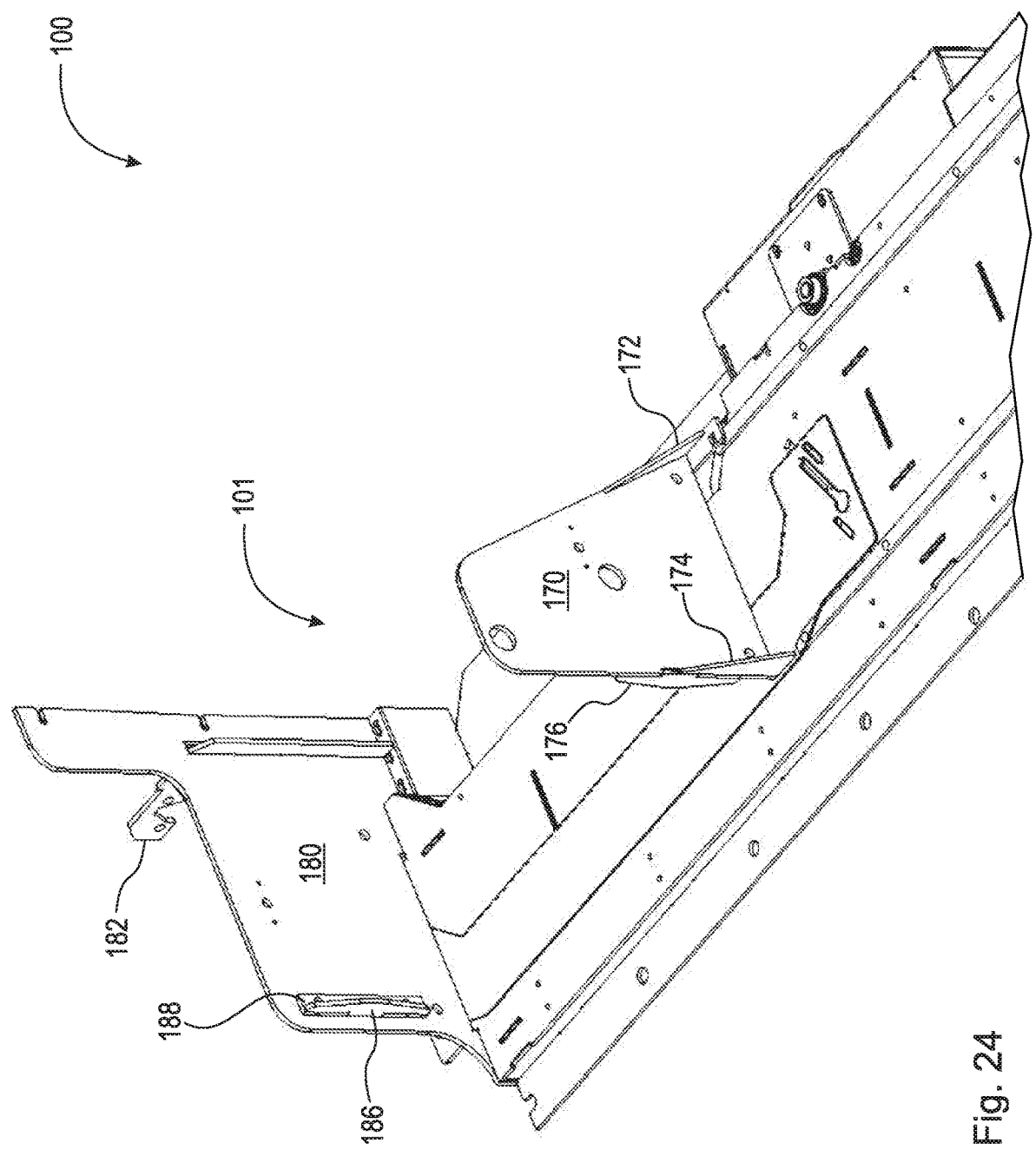
FIG. 24 is a rear left perspective view of the assembly as shown in FIG. 3 focusing on the load transfer assembly.

FIG. 24 is a rear left perspective view of assembly 100 including load transfer assembly 101; step well 140 is mostly not visible from this perspective.

Figure 25:
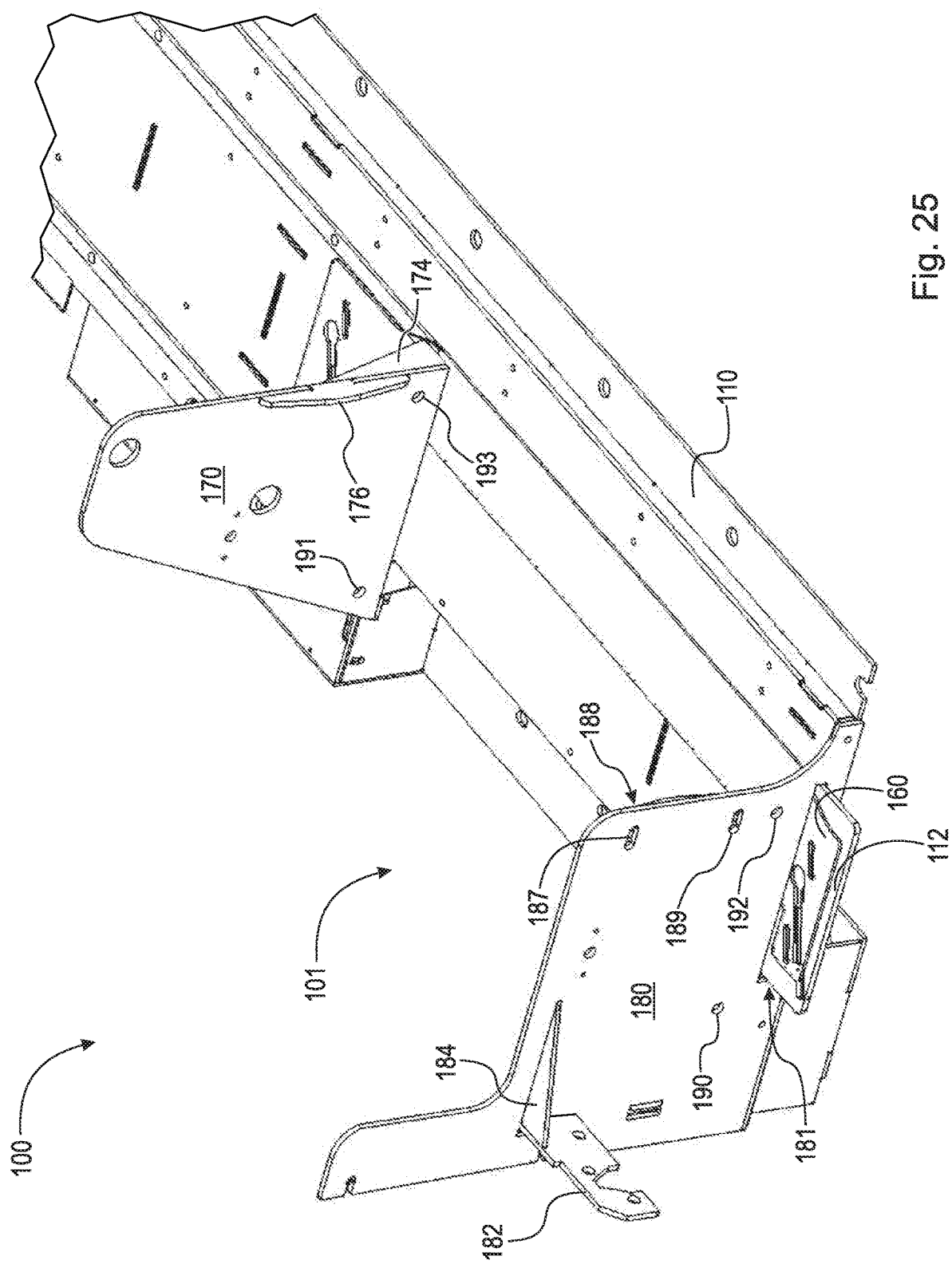
FIG. 25 is a rear right perspective view of the assembly as shown in FIG. 3 focusing on the load transfer assembly.
Figure 26:
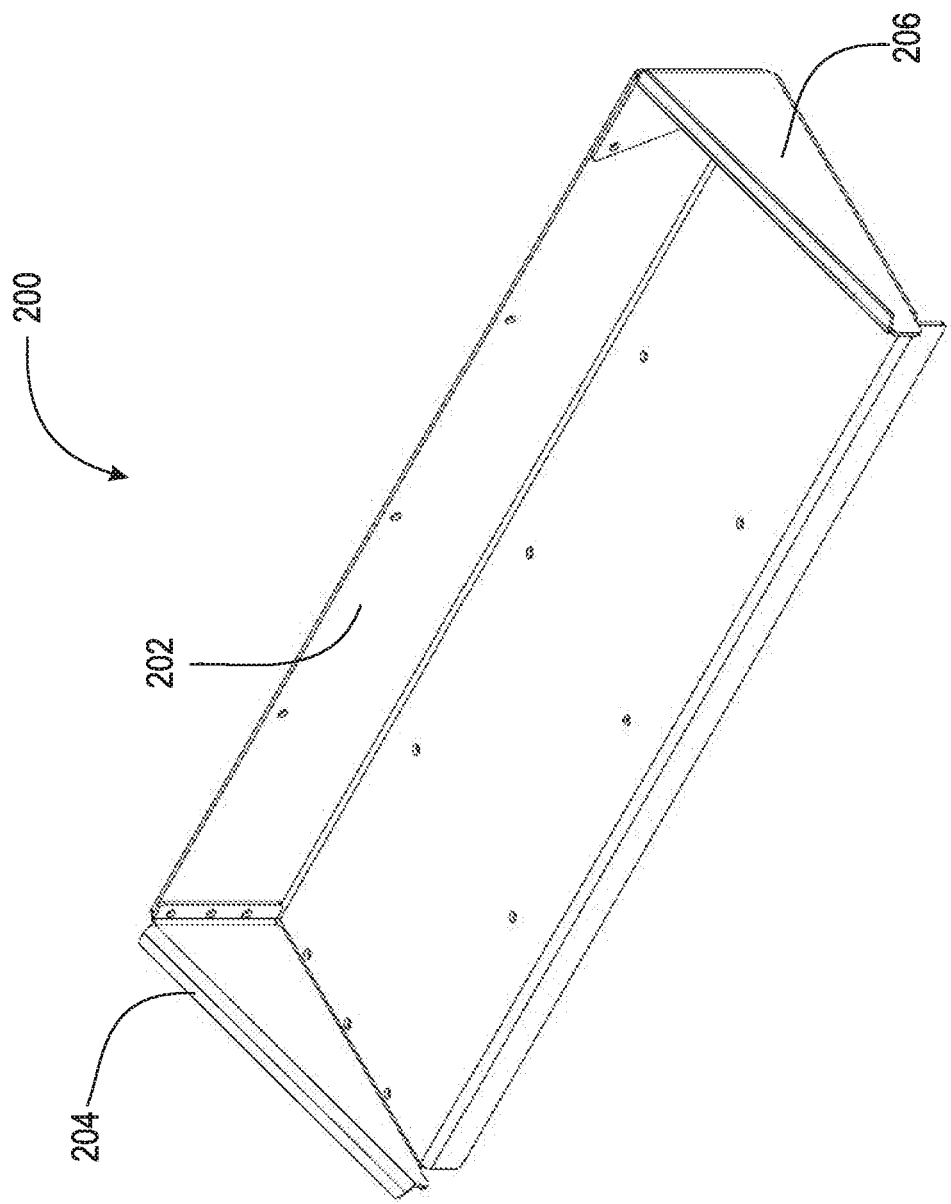
FIG. 26 is a front perspective view of the bus step assembly of the invention in isolation.
Figure 27:
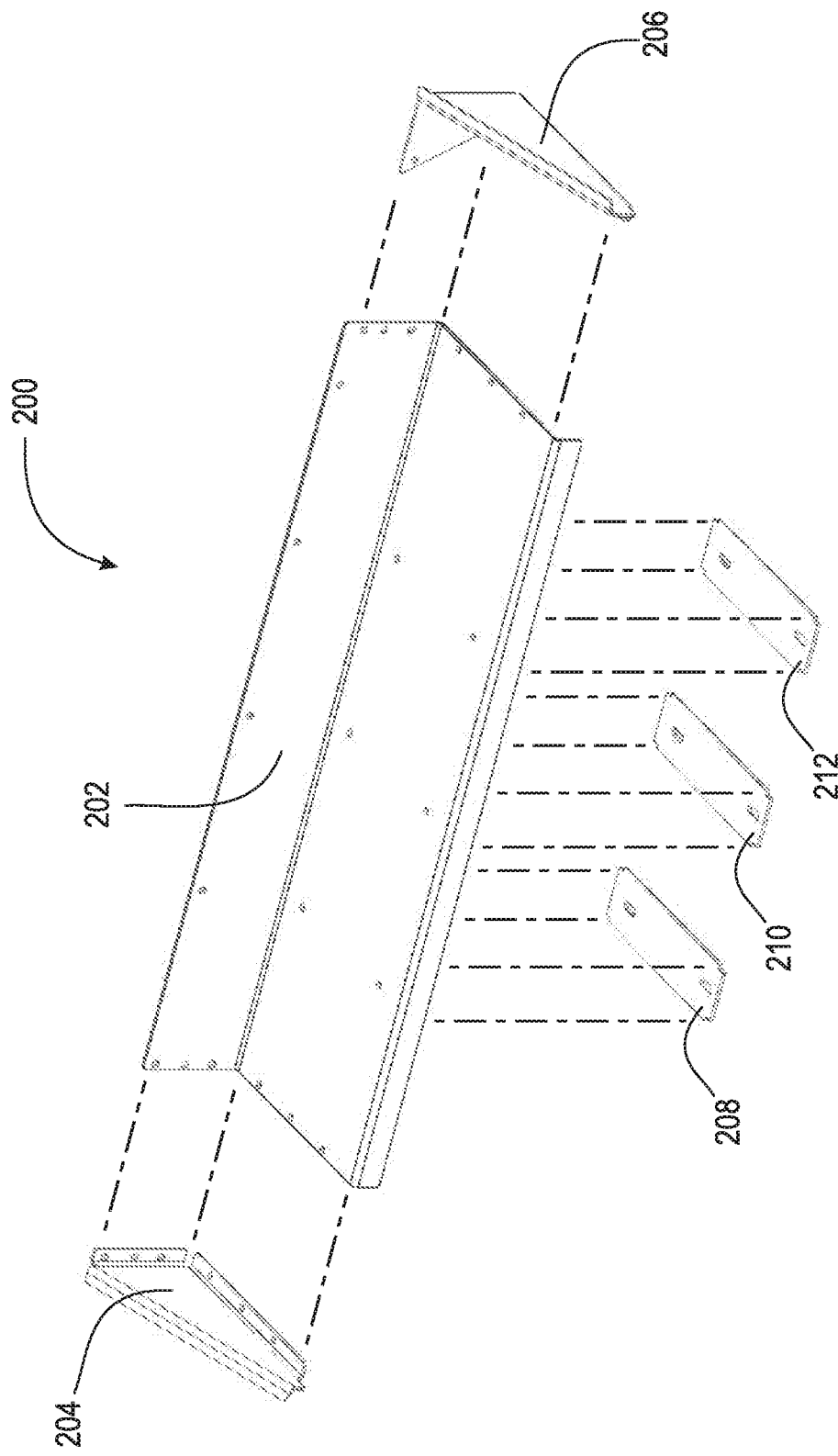
FIG. 27 is an exploded perspective view of the bus step assembly shown in FIG. 26.
Figure 28:
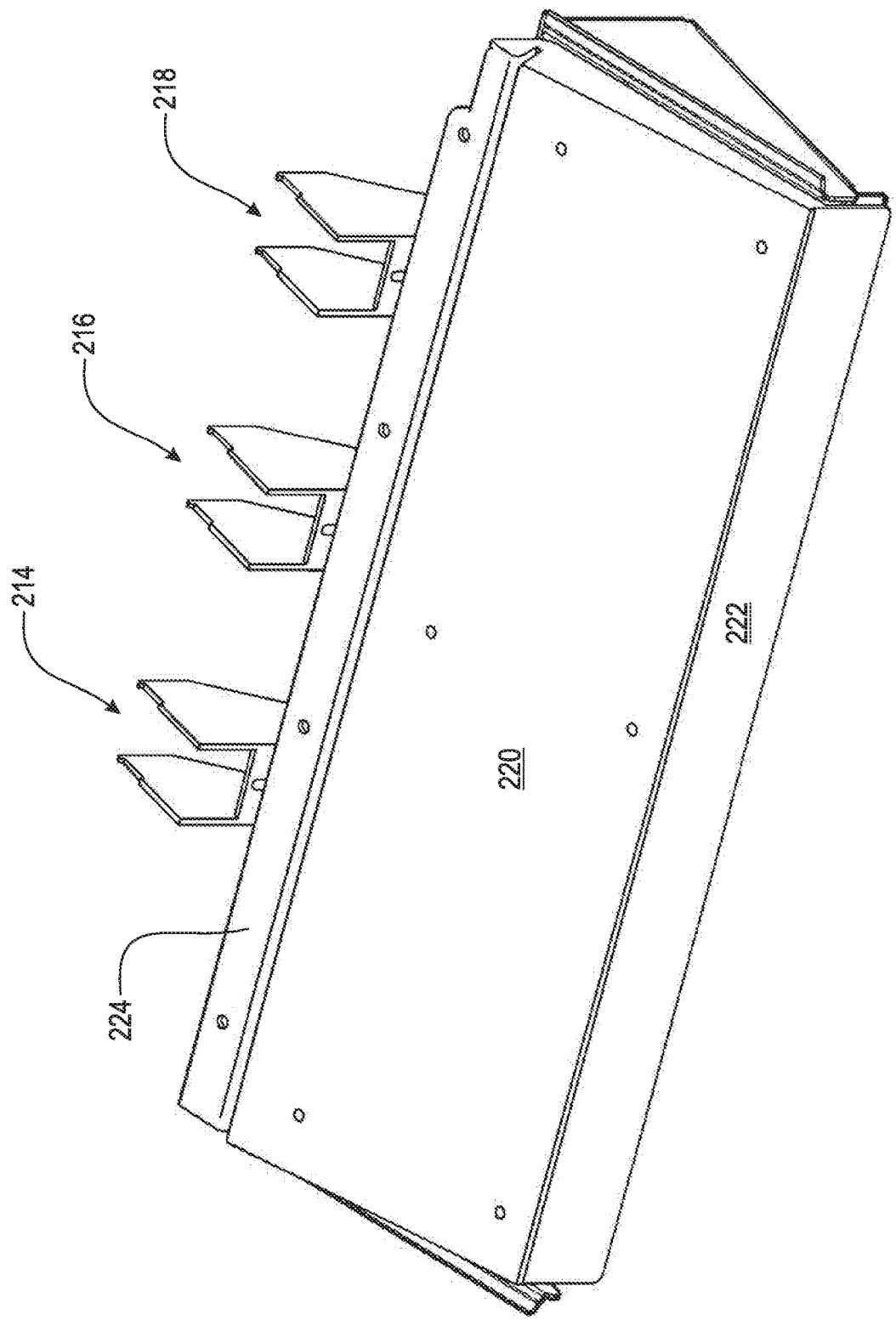
FIG. 28 is a front perspective view of the bus step assembly of the invention in isolation taken from FIG. 3.
Figure 29:
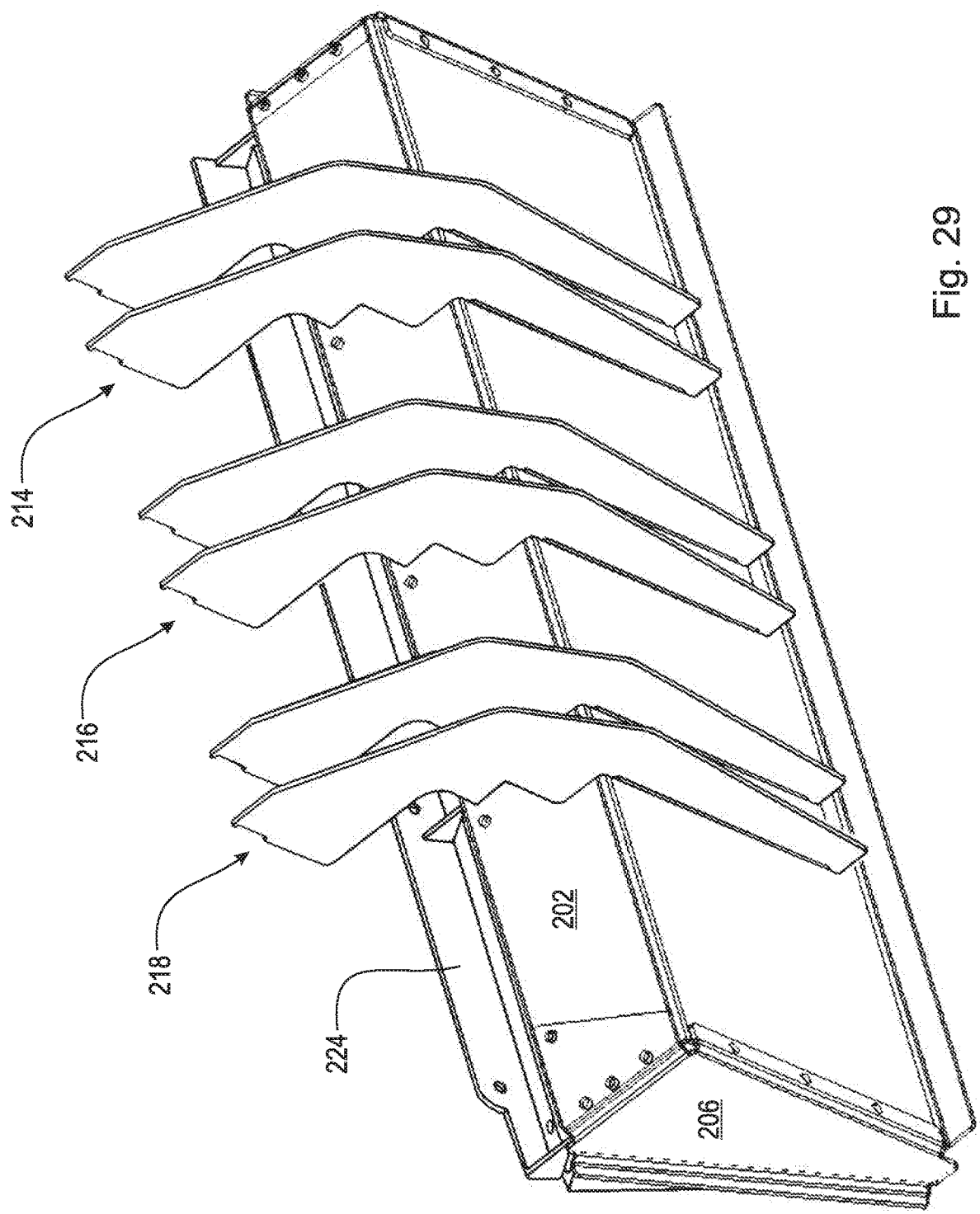
FIG. 29 is a rear perspective view of the bus step assembly shown in FIG. 28; and, FIG. 30 is an exploded perspective view of the bus step assembly shown in FIGS. 28 and 29.
Figure 30:
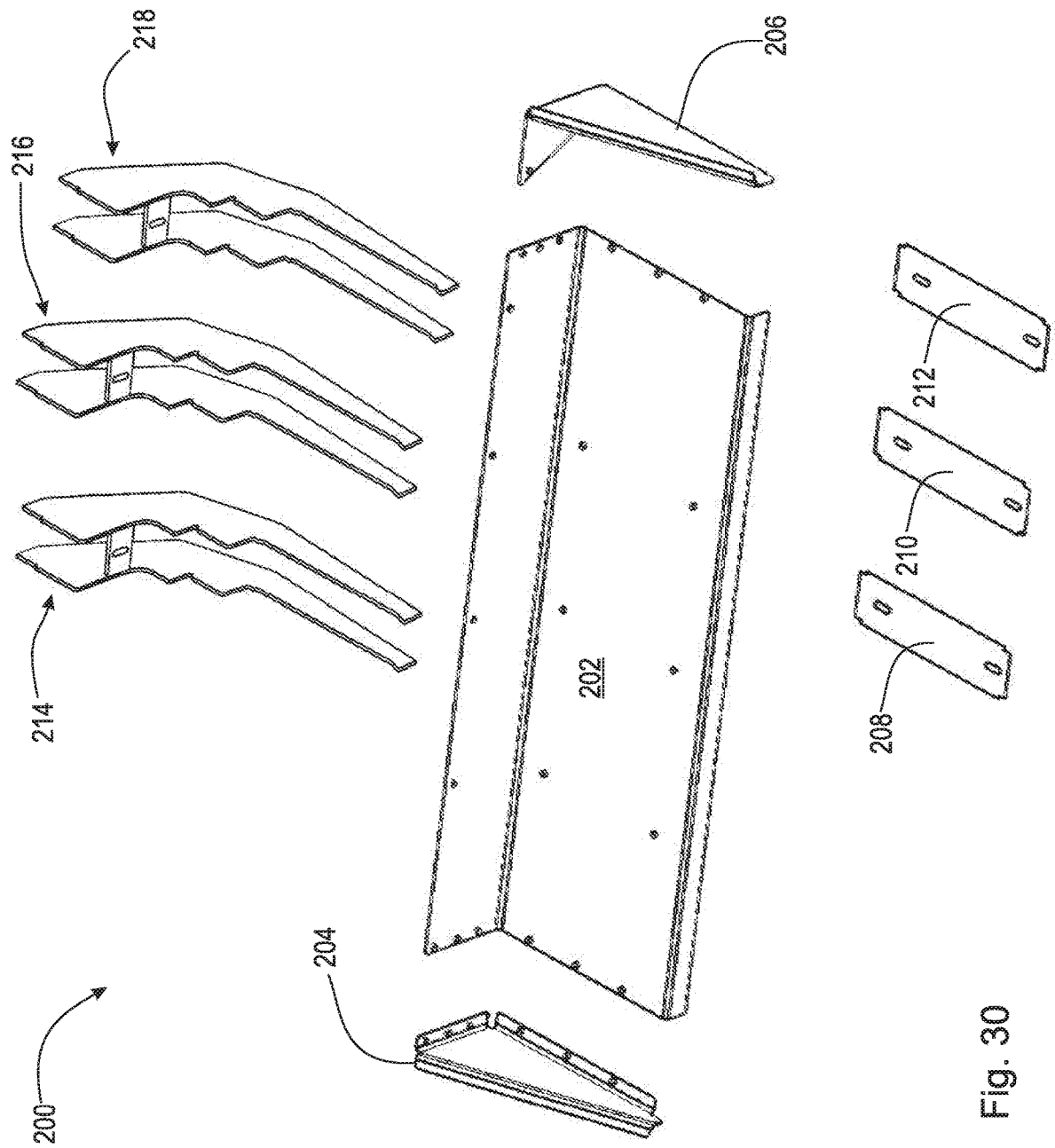

FIG. 25 is a rear right perspective view of assembly 100 including load transfer assembly 101 and step well 140. The following should be viewed in light of FIGS. 22-25. In an example embodiment, assembly 100 includes vertical plate 170 extending upwardly from supports 122 and 124. Vertical plate 170 is also secured by gussets 172 and 174. Vertical stabilization member 176 extends from vertical plate 170 towards B pillar plate 180. In an example embodiment, member 176 includes an adjustment plate (not shown). In an example embodiment, assembly 100 includes B pillar plate 180 which is connected to housing 102 and step well 140. B pillar plate 180 includes slot 181 which is arranged to receive slide plate 160 and a portion of top plate 112. To further secure B pillar plate 180, B pillar bracket 182 is secured to and extends from B pillar plate 180; B pillar bracket 182 is securable to a B pillar of vehicle 10. Gusset 184 is arranged to further support B pillar bracket 182 with B pillar plate 180. Vertical stabilization member 186 extends from B pillar plate 180 towards vertical plate 170. Vertical stabilization member 186 can be adjusted by adjustment member 188.

As shown in FIG. 25, adjustment member 188 can be slid along lateral openings 187 and 189.

In the stored position described herein, vertical plate 170 is disposed a distance from B pillar plate 180 approximately the length of step well 140. When assembly 100 is displaced in operation as described herein, vertical plate 170 is displaced toward B pillar plate 180. In its final position (not shown), vertical plate 170 is adjacent to B pillar plate 180 and vertical stabilization member 176 contacts vertical stabilization member 186. As discussed above, vertical stabilization member 186 is adjustable so that such contact occurs. When vertical plate 170 is adjacent to B pillar plate 180 and vertical stabilization members 176 and 186 abut, load from wheelchair lift 1 can be transferred from vertical plate 170, through vertical stabilization member 176, through vertical stabilization member 186, and to B pillar plate 180. Advantageously, this load transfer enables a wheelchair lift to be operated with adequate support In other words, when wheelchair lift 1 is extended to receive a wheelchair-bound person, the force of the lift is counteracted by the components of load transfer assembly 101.

In an example embodiment, assembly 100 includes photoelectric sensors 190 and 192 to detect when an object or person is obstructing the path for the operation of wheelchair lift 1. Sensors 190, 191, 192, and 193 can include a transmitter and a receiver located within the line-of-sight of the transmitter. For example, in FIG. 25, a transmitter can be arranged in B pillar plate 180 and a receiver can be arranged in plate 170, or vice versa, and when a transmitted beam is interrupted by an object or a person, the wheelchair lift can be stopped to prevent injury. Any suitable sensor can be used, for example, a garage door safety sensor. Sensors 190, 191, 192, and 193 may be motion detectors such as passive infrared sensors, microwave detectors, ultrasonic wave detectors, tomographic motion detectors, video camera software, and gesture detectors.

FIGS. 26-30 illustrate step assembly 200. In an example embodiment, assembly 100 further includes bus step assembly 200. Assembly 200 includes tread riser 202, end caps 204 and 206, support plates 208, 210, and 212, and bracket arm pairs 214, 216, and 218. Each pair 214, 216, and 218 includes a mating plate. Pairs 214, 216, and 218 can be secured to step well 140 as depicted in FIG. 3.

In an example embodiment, assembly 200 includes cover 220, front lip 222, bracket plate 224.

Assembly 100 can be operated as follows. First, assembly 100 must be installed in floor 12 of vehicle 10. Second, wheelchair lift 1 must be secured to assembly 100. Once assembly is complete, assembly 100 can be actuated to operate wheelchair lift 1. To operate wheelchair lift 1, assembly 100 displaces wheelchair lift 1 along wheelbase WB so that the lift is aligned with the side door opening of the vehicle. Once wheelchair lift 1 is aligned with the side door opening, the lift can be extended to receive a wheelchair-bound passenger. When wheelchair lift 1 is no longer needed, assembly 100 can be actuated to displace wheelchair lift 1 along wheelbase WB so that the lift does not obstruct the side door opening.

In the event of a controller failure, assembly 100 includes a fail-safe controller which would include a method of moving the motor using simple connections, such as, a key or a dial that could be used to make a direct connection between the battery and the motor in either polarity.

In the event of a failure of motor 115, manual gear 109 can be accessed to manually move assembly 100 either forward into position for operation or into a stored position. Any suitable crank can be used to mate with gear 109. Any other suitable mechanical device is contemplated.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Lift
10 Vehicle
12 Floor
14 Opening
100 Assembly
101 Load transfer assembly
102 Housing
104 Slidable member
106 Gear rack
108 Gear
109 Manual gear
110 Bottom plate
112 Top plate
114 Channel
M Means
115 Motor
116A Vertical plate
116B Vertical plate
116C Vertical plate
116D Vertical plate
116E Vertical plate
116F Vertical plate
116G Vertical plate
117A Spacer
117B Spacer
117C Spacer
117D Spacer
117E Spacer
116E Vertical plate
118A Vertical plate
118B Vertical plate
118C Vertical plate
120 Slidable member
122 Support
124 Support
126 Channel
128 Channel
130 Layer
131 Layer
132 Layer
133 Layer
140 Step well
142 Plate
144 Plate
146 Plate
148 Plate
150 Plate
152 Plate
154 Cover
156 Plate
158 Plate
WB Wheel base
160 Slide plate
162 Surface
164 Bracket
166 Bracket
168 Bracket
D Direction
170 Vertical plate
172 Gusset
174 Gusset
176 Vertical stabilization member
178 Adjustment member
180 B pillar plate
181 Slot
182 B pillar bracket
184 Gusset
186 Vertical stabilization member
187 Opening
188 Adjustment member
189 Opening
190 Photoelectric eye
191 Sensor
192 Photoelectric eye
193 Sensor
200 Step assembly
202 Tread riser
204 End cap
206 End cap
208 Support plate
210 Support plate
212 Support plate
214 Bracket arm pair
216 Bracket arm pair
218 Bracket arm pair
220 Cover
222 Front lip
224 Bracket plate

What is claimed is:

1. An assembly for shifting a wheelchair lift within a vehicle, comprising:
    a housing arranged to be secured to a floor of the vehicle and extend substantially parallel relative to an opening of a side doorway in the vehicle, the housing comprising:
        a bottom plate fixedly connected to a top plate and forming a first channel therebetween;
        a slidable member arranged within the first channel; and,
        a means for displacing the slidable member along the first channel from a first position when stored to a second position in operation, wherein the means for displacing the slidable member comprises a gear rack fixedly secured to the slidable member and a first gear, wherein the first gear meshes with the gear rack;
    wherein:
        the slidable member moves independently of the top and bottom plates; and
        the wheelchair lift is connected to the slidable member.

2. The assembly as recited in claim 1, wherein the first gear is rotatably secured to the bottom plate.

3. The assembly as recited in claim 2, wherein the means for displacing the slidable member further comprises a motor that is non-rotatably connected to the first gear.

4. The assembly as recited in claim 2, wherein the means for displacing the slidable member further comprises a key or a dial used to turn the first gear manually.

5. The assembly as recited in claim 1, further comprising a second gear arranged to mesh with the gear rack, wherein the second gear is turned manually to displace the slidable member.

6. The assembly as recited in claim 1, wherein the top plate comprises a second channel.

7. The assembly as recited in claim 6, further comprising a support fixedly secured to the slidable member, the support arranged to engage the second channel and extend through the top plate.

8. The assembly as recited in claim 7, further comprising a vertical plate secured to the support, wherein the wheelchair lift is secured to the vertical plate.

9. The assembly as recited in claim 8, further comprising a B pillar plate connected to the bottom plate.

10. The assembly as recited in claim 9, wherein the B pillar plate comprises a B pillar bracket secured thereto and arranged to secure to a B pillar of the vehicle.

11. The assembly as recited in claim 1, further comprising a step well secured to the bottom plate.

12. The assembly as recited in claim 11, further comprising a step assembly secured to the step well.

13. The assembly as recited in claim 11, further comprising a slide plate slidably secured to the top plate, wherein the slide plate is arranged substantially adjacent the step well.

14. An assembly for shifting a wheelchair lift within a vehicle, comprising:
  a housing arranged to be secured to a floor of the vehicle and extend substantially parallel relative to an opening of a side doorway in the vehicle, the housing comprising:
    a bottom plate;
    a top plate fixedly connected to the bottom plate and forming a first channel and a second channel therebetween, the top plate comprising:
      a first aperture; and,
      a second aperture;
    a first slidable member arranged within the first channel;
    a second slidable member arranged within the second channel;
  a means for displacing the first and second slidable members along the first and second channels, respectively, from a first position when stored to a second position in operation; and,
  a first support fixedly secured to the first slidable member, the first support arranged to engage the first aperture and extend through the top plate;
  wherein the first and second slidable members move independently of the top and bottom plates.

15. The assembly as recited in claim 14, wherein the means for displacing the first and second slidable members comprises a gear rack fixedly secured to the first slidable member and a first gear, wherein the first gear meshes with the gear rack.

16. The assembly as recited in claim 15, wherein the first gear is rotatably secured to the bottom plate.

17. The assembly as recited in claim 14, further comprising a second support fixedly secured to the second slidable member, wherein the second support is arranged to engage the second apertures and extend through the top plate.

18. The assembly as recited in claim 17, further comprising a vertical plate secured to the first and second supports, wherein the wheelchair lift is secured to the vertical plate.

19. An assembly for shifting a wheelchair lift within a vehicle, comprising:
  a housing arranged to be secured to a floor of the vehicle and extend substantially parallel relative to an opening of a side doorway in the vehicle, the housing comprising:
    a bottom plate fixedly connected to a top plate and forming at least one channel therebetween, the top plate comprising an aperture;
    at least one slidable member arranged within the at least one channel;
    a support fixedly secured to the at least one slidable member, the support arranged to engage the aperture and extend through the top plate; and,
  a means for displacing the at least one slidable member along the at least one channel from a first position when stored to a second position in operation;
  wherein the at least one slidable member moves independently of the top and bottom plates.

* * * * *